(12) United States Patent
Murakami

(10) Patent No.: US 9,025,223 B2
(45) Date of Patent: May 5, 2015

(54) IMAGE PROCESSING APPARATUS, IMAGE PROCESSING METHOD, AND STORAGE MEDIUM FOR COLOR MATCHING

(75) Inventor: Katsuyuki Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 13/365,476

(22) Filed: Feb. 3, 2012

(65) Prior Publication Data

US 2012/0206743 A1 Aug. 16, 2012

(30) Foreign Application Priority Data

Feb. 16, 2011 (JP) ................... 2011-031262

(51) Int. Cl.
*G03F 3/08* (2006.01)
*H04N 1/60* (2006.01)

(52) U.S. Cl.
CPC ........... *H04N 1/6055* (2013.01); *H04N 1/6058* (2013.01)

(58) Field of Classification Search
USPC ................ 358/1.9, 2.1, 518; 345/604, 601; 382/167
See application file for complete search history.

(56) References Cited

U.S. PATENT DOCUMENTS

| | | | |
|---|---|---|---|
| 6,198,552 B1 * | 3/2001 | Nagae | 358/518 |
| 6,323,969 B1 | 11/2001 | Shimizu et al. | |
| 6,360,008 B1 * | 3/2002 | Suzuki et al. | 382/167 |
| 6,552,732 B1 | 4/2003 | Davis, Jr. et al. | |
| 6,952,494 B2 | 10/2005 | Odagiri et al. | |
| 2002/0054314 A1 * | 5/2002 | Takahashi | 358/1.13 |
| 2004/0051888 A1 * | 3/2004 | Zolliker | 358/1.9 |
| 2004/0096104 A1 | 5/2004 | Terekhov | |
| 2007/0229868 A1 | 10/2007 | Kanai | |
| 2011/0249280 A1 | 10/2011 | Ito | |
| 2011/0316973 A1 | 12/2011 | Miller et al. | |

FOREIGN PATENT DOCUMENTS

| | | |
|---|---|---|
| JP | 2004-015643 A | 1/2004 |
| JP | 3566350 B | 9/2004 |
| JP | 2006-165864 A | 6/2006 |

OTHER PUBLICATIONS

U.S. Appl. No. 13/365,804, filed Feb. 3, 2012 to Masato Kobayashi.

* cited by examiner

*Primary Examiner* — Jamares Q Washington
(74) *Attorney, Agent, or Firm* — Carter, DeLuca, Farrell & Schmidt, LLP

(57) ABSTRACT

There is provided an image processing apparatus comprising: a common color reproduction range generation unit configured to select the data of interest as common color reproduction range data if the data of interest is determined by the first color reproduction range determination unit to fall within the color reproduction range of the first output device and is determined by the second color reproduction range determination unit to fall within the color reproduction range of the second output device; and a table correction unit configured to correct output values for respective grid points of a first color conversion table included in the image processing apparatus in accordance with differences between the reference values and the colorimetric values corresponding to the common color reproduction range data.

13 Claims, 25 Drawing Sheets

F I G. 24
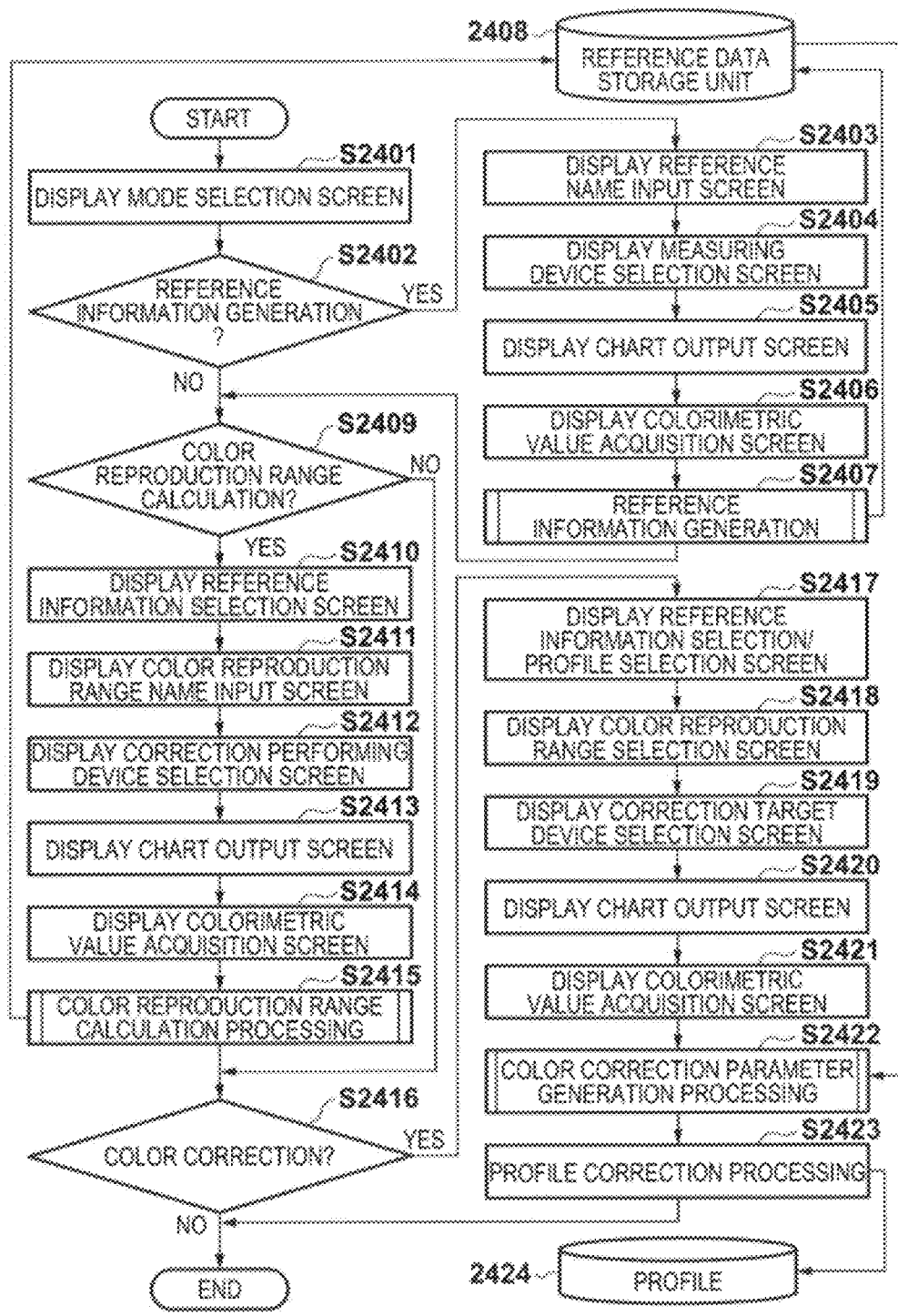

IMAGE PROCESSING APPARATUS, IMAGE PROCESSING METHOD, AND STORAGE MEDIUM FOR COLOR MATCHING

BACKGROUND OF THE INVENTION

1. Field of the Invention

The present, invention relates to an image processing apparatus required to control to match colors of images output from different devices, an image processing method, and a storage medium.

2. Description of the Related Art

In recent, years, the performance of printers that form images using an electrophotography system has improved, and models that, realize image quality that is equivalent to a printing press have appeared. However, such printers suffer from problems of a larger variation in the amount of formed colors than a printing press due to instability that is unique to the electrophotography system. In order to suppress this variation in amounts, a conventional electrophotographic printer executes calibrations by incorporating one-dimensional tone correction LUTs (Look Up Tables) corresponding to cyan (C), magenta (M), yellow (Y), and black (K) toners. Note that the LOT is a table that indicates output data corresponding to input data whose tones are divided at predetermined intervals, and can express nonlinear characteristics which cannot be expressed, by calculation formulas. The one-dimensional tone correction LUTs express output signal values on the printer side, which can express C, M, Y, and K input signal values, and the printer forms an image on a print sheet using toners corresponding to the output signal values.

The tone correction LUT generation processing will be described below. Charts based, on a plurality of data of different tones, which correspond to the C, M, Y, and K toners, are prepared, and are output by the printer. The charts output by the printer are read by a scanner, colorimeter, or the like, and the read values are compared, with target data, which are prepared, in advance, thus generating one-dimensional LUTs for correction.

Using the one-dimensional LUTs generated in this way, data respectively expressed by C, M, Y, and K unicolors can be corrected with high precision. However, even when tone characteristics of these unicolors are matched, it is difficult to guarantee colors of mixed colors such as red (R), green (G), and blue (B). Thus, a technique that focuses attention on a destination profile of ICC profiles specified by the International Color Consortium, and modifies it to correct, colors of mixed colors has been proposed (for example, see Japanese Patent Laid-Open No. 2006-165864). With this technique, a chart, generated using mixed colors is output by a printer, and is measured by a scanner or colorimeter. Then, based, on differences between colorimetric results and target values, an LUT (destination profile), which, is included in the ICC profiles and is required to convert a device-independent color space (L*a*b*) into a device-dependent color space (CMYK), is updated. Thus, colors of the mixed colors can be corrected. Note that L*a*b* is one of device-independent color spaces defined by the CIS (International Commission on Illumination), L* represents luminance, and a*b* represent hue and saturation. In addition, by generating a four-dimensional LUT used to correct CMYK, colors of the mixed colors can also be corrected.

However, the conventional technique for correcting the mixed colors is that for correcting colors of the mixed colors of a correction performing device itself, when mixed color characteristics of devices having different color reproduction ranges are to be matched, mismatching may often occur. When a corrected color of a certain device becomes a color which cannot be reproduced by that device as a result of processing for matching colors to those of another device, correction precision of that color is worsened. When a plurality of colors around a color close to a boundary of a color reproduction range are to be corrected using a correction result of that color, the correction result of the color also influences surrounding colors. Therefore, colors of the mixed colors between a plurality of devices having different color reproduction ranges cannot be matched.

SUMMARY OF THE INVENTION

In order to solve the aforementioned problems, the present invention provides a technique for precisely matching colors of output images between devices having different color reproduction ranges.

According to one aspect of the invention, an image processing apparatus comprises: a first color reproduction range acquisition unit configured to acquire first, color reproduction range data which represents a color reproduction range of a first output device; a first color reproduction range determination unit configured to determine based on the first color reproduction range data whether or not data of interest on a device-independent color space falls within the color reproduction range of the first output device; a second color reproduction range acquisition unit configured to acquire second color reproduction range data which represents a color reproduction range of a second output device; a second color reproduction range determination unit configured to determine based, on the second color reproduction range data whether or not the data of interest falls within the color reproduction range of the second output device; a common color reproduction range generation unit configured to select the data of interest as common color reproduction range data if the data of interest is determined by the first color reproduction range determination unit to fall within the color reproduction range of the first output device and is determined by the second color reproduction range determination unit to fall within the color reproduction range of the second, output device; a colorimetric value acquisition unit configured to acquire colorimetric values of an image which is output from the first output device using the common color reproduction range data; a reference value acquisition unit configured to acquire, as reference values, colorimetric values of an image which, is output from the second output device using the common color reproduction range; a table correction unit configured to correct output values for respective grid points of a first color conversion table included in the image processing apparatus in accordance with differences between the reference values and the colorimetric values corresponding to the common, color reproduction range data, wherein the first color conversion table indicates a correspondence from a device-independent color space to a device-dependent color space; and a table generation unit configured to set conversion results of data which represent grid points of a third color conversion table as output values for the grid points of the third color conversion table, wherein the conversion result is obtained by performing conversion using at second color conversion table included in the image processing apparatus and the first color conversion table corrected by the table correction unit, wherein the second color conversion table indicates a correspondence from the device-dependent color space to the device-independent color space, and wherein the third color conversion table is used to correct image data to be output on the device-dependent color space.

According to another aspect of the invention, an image processing apparatus comprises; a first color reproduction range acquisition unit configured to acquire first color reproduction range data which represents a color reproduction range of the first output device; a first color reproduction range determination unit configured to determine based, on the first color reproduction range data whether or not data of interest on the device-independent color space falls within the color reproduction range of the first output device; a second color reproduction range acquisition unit configured to acquire second color reproduction range data which represents a color reproduction range of the second output device; a second color reproduction range determination unit configured, to determine based on the second color reproduction range data, whether or not the data of interest falls within the color reproduction range of the second output device; a common, color reproduction range generation unit configured, to hold the data of interest as common color reproduction range data if the data of interest is determined by the first color reproduction range determination unit to fall within the color reproduction range of the first output device; a flag setting unit configured to set, for the common color reproduction range data, an ON flag when the second color reproduction range determination unit determines that the data of interest falls within the color reproduction range of the second output device, and an OFF flag when the second color reproduction range determination unit determines that the data of interest falls outside the color reproduction range of the second output device; a colorimetric value acquisition unit configured to acquire colorimetric values of an image which is output, by the first output device using on the common color reproduction range data; a reference value acquisition unit configured to acquire colorimetric values of an image as reference values, which, image is output from the second output device using the common color reproduction range data; a reference value combining unit configured to set combined reference values for the common color reproduction range data, wherein the reference value corresponding to the flag is used when, the flag is ON and the common color reproduction range data, corresponding to the flag when the flag is OFF; a table correction unit configured to correct output values for respective grid points of a first color conversion table included in the image processing apparatus in accordance with differences between the combined reference values corresponding to the common color reproduction range data and the calorimetric values, wherein the first color conversion table indicates a correspondence from a device-independent color space to a device-dependent color space; and a table generation unit configured, to set conversion results of data which represent grid points of a third, color conversion table as output values for the grid points of the third color conversion table, wherein the conversion result is obtained by performing conversion using the second color conversion table included in the image processing apparatus and the first color conversion table corrected by the table correction unit, wherein the second color conversion table indicates a correspondence from the device-dependent color space to the device-independent color space, and wherein the third color conversion table is used to correct image data to be output on the device-dependent color space.

According to still another aspect of the invention, an image processing method comprises: a first acquisition step of acquiring first color reproduction range data which represents a color reproduction range of a first output device; a first determination step of determining based on the first color reproduction range data whether or not data of interest on a device-independent color space falls within the color reproduction range of the first output device; a second acquisition step of acquiring second color reproduction range data which represents a color reproduction range of a second output device; a second determination step of determining based on the second color reproduction range data whether or not the data of interest falls within the color reproduction range of the second output device; a selection step of selecting the data of interest as common color reproduction range data, if the data of interest is determined, in the first determining step to fall within the color reproduction range of the first output device and is determined in the second, determination step to fall within, the color reproduction range of the second output device; an acquisition step of acquiring colorimetric values of an image which is output from the first output device using the common color reproduction range data; an acquisition step of acquiring, as reference values, colorimetric values of an image which is output from the second, output device using the common color reproduction range; a correction step of correcting output values for respective grid points of a first color conversion table included in an image processing apparatus in accordance with differences between the reference values and the calorimetric values corresponding to the common color reproduction range data, wherein the first color conversion table indicates a correspondence from a device-independent color space to a device-dependent color space; and a setting step of setting conversion results of data which represent grid, points of a third color conversion table as output values for the grid points of the third color conversion table, wherein the conversion result is obtained by performing conversion using a second color conversion table included in the image processing apparatus and the first color conversion table corrected in the correction step, wherein the second color conversion table indicates a correspondence from the device-dependent color space to the device-independent color space, and wherein the third color conversion table is used to correct image data to be output on the device-dependent color space.

According to yet another aspect, of the invention, an image processing apparatus comprises: a first color reproduction range acquisition unit configured to acquire first color reproduction range data which, represents a color reproduction range of a first output device; a first color reproduction range determination unit configured to determine based on the first color reproduction range data whether or not data of interest falls within the color reproduction range of the first output device; a second color reproduction range acquisition unit configured to acquire second color reproduction range data which represents a color reproduction range of a second output device; a second color reproduction range determination unit configured to determine based on the second color reproduction range data, whether or not the data of interest falls within the color reproduction range of the second output device; a common color reproduction range generation unit configured to select the data of interest as common color reproduction range data if the data of interest is determined by the first color reproduction range determination unit to fall within the color reproduction range of the first output device and is determined by the second color reproduction range determination unit to fall within the color reproduction range of the second output device; a colorimetric: value acquisition unit configured to acquire colorimetric values of an image which is output from the first output device using the common color reproduction range data; a reference value acquisition unit configured to acquire, as reference values, colorimetric values of an image which is output from the second output device using the common color reproduction range; a table correction unit configured to correct output values for respective grid points of a first color conversion table included in the image processing apparatus in accordance with differences between the reference values and the colorimetric values corresponding to the common color reproduction range data.

According to the invention, a technique for precisely matching colors of output images between devices having different color reproduction ranges is provided.

Further features of the present invention will become apparent from the following description of exemplary embodiments (with reference to the attached drawings).

BRIEF DESCRIPTION OF THE DRAWINGS

FIG. 24 is a flowchart showing a UI transition example according to the third embodiment;

DESCRIPTION OF THE EMBODIMENTS

Embodiments according to the present invention will be described in detail hereinafter with reference to the drawings. Note that the following embodiments do not limit the present invention according to the scope of the claims, and all of combinations of characteristic features described in the embodiments are not always indispensable in the present invention.

<First Embodiment>

This embodiment will explain a method of generating a color conversion table (third color conversion table) required to apply color conversion, on a device-dependent color space to output target image data so as to match colors of output images between different devices.

System Arrangement

Figure 1:
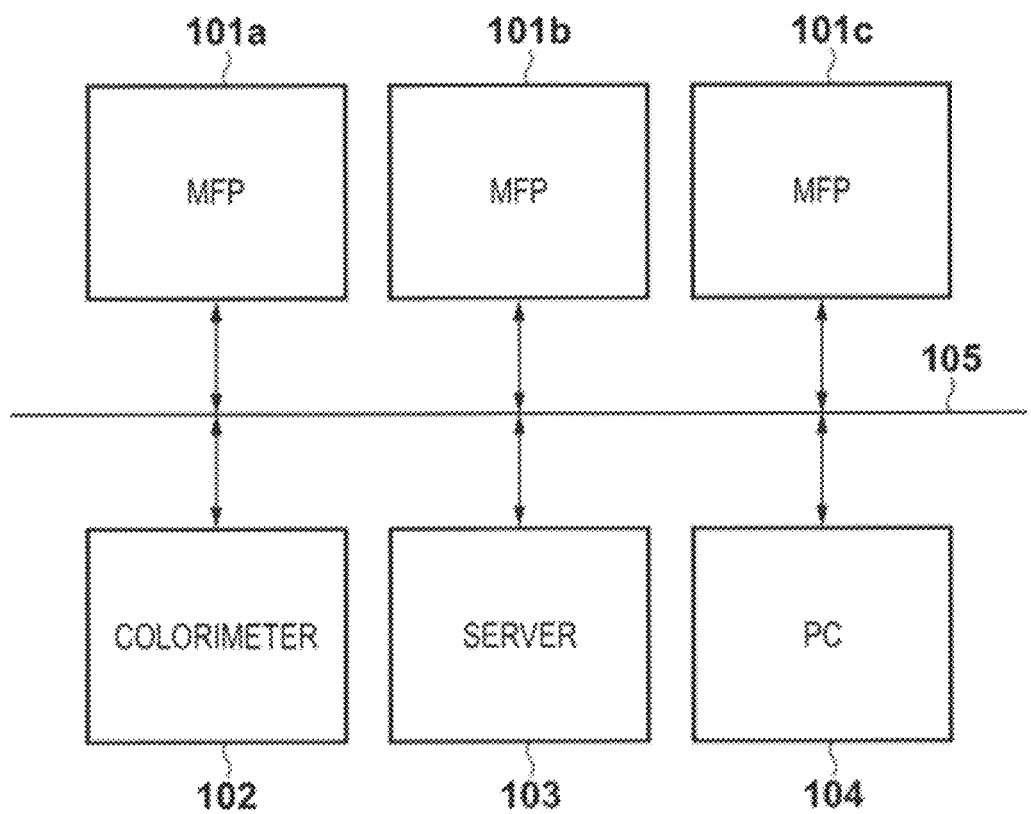
FIG. 1 is a block diagram showing the overall configuration of an image processing system according to an embodiment of the present invention.
Figure 2:
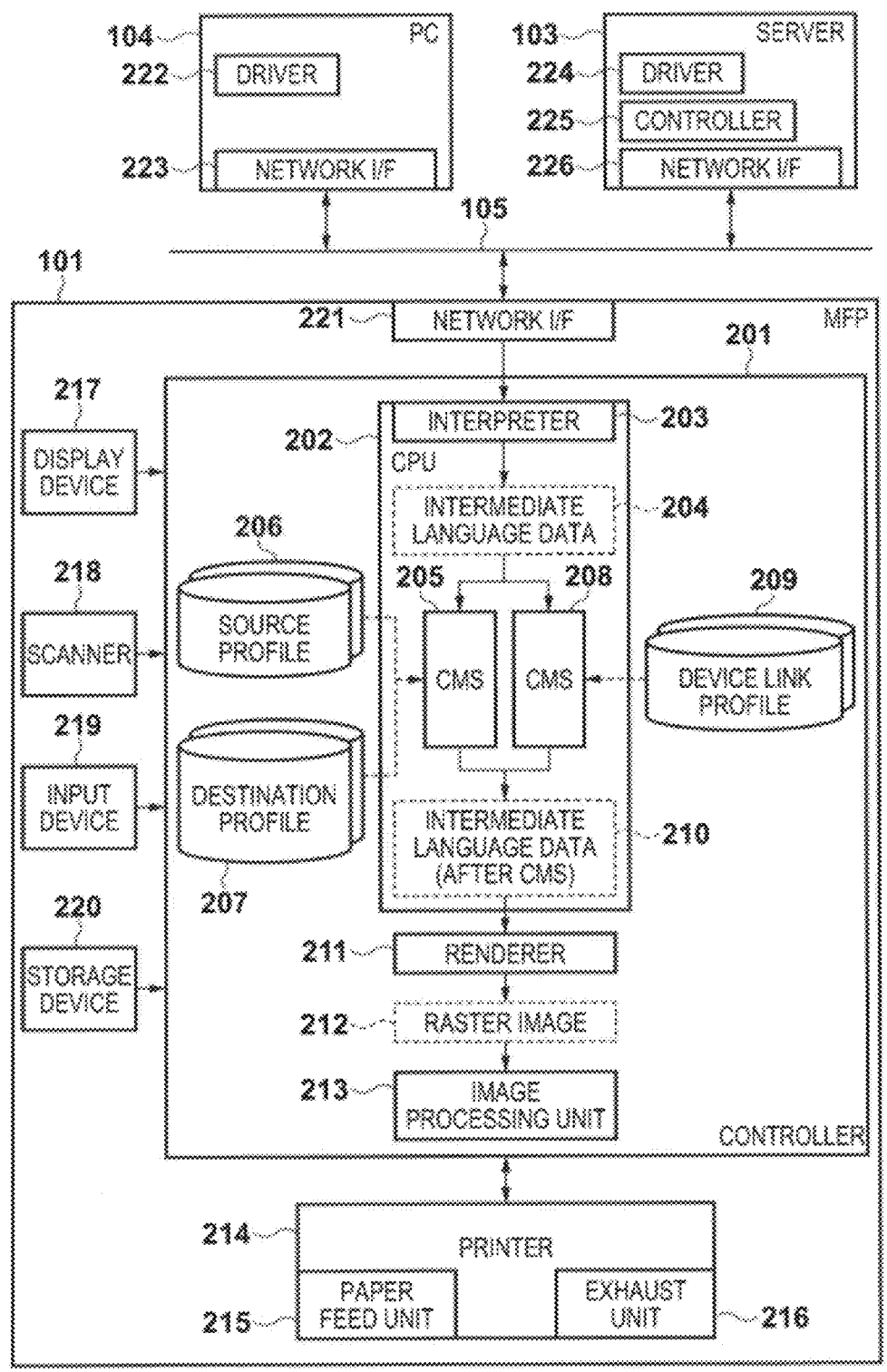
FIG. 2 is a block diagram showing the detailed arrangement of the image processing system.

FIGS. 1 and 2 are block diagrams respectively showing an overview and the detailed arrangement of an image processing system according to the present invention. As shown in FIG. 1, MFPs 101a, 101b, and 101c, each of which uses cyan (C), magenta (M), yellow (Y), and black (K) toners, are connected to each other via a network 105. These plurality of MFPs 101a, 101b, and 101c will be referred to collectively as MFPs 101. A server 103 and PC 104 are connected to the MFPs 101 via the network 105. A colorimeter 102 is a device which can acquire values on a device-independent color space such as L*a*b* or XYZ by reading a chart image, and can transmit the read data to the server 103, PC 104, and MFFs 101 via the network 105.

FIG. 2 is a block diagram showing the detailed arrangements of the server 103, PC 104, and each MFP 101. Since the arrangement of the MFPs 101 is common to the plurality of MFPs 101a, 101b, and 101c, the arrangement of one MFP 101 will be described below.

A driver 224 of the server 103 transmits print data to the MFP 101 using a network I/F 226. Likewise, a driver 222 of the PC 104 transmits print data to the MFP 101 using a network I/F 223.

The arrangement of the MFP 101 will be described in detail below. A network I/F 221 is used, to receive print data and the like, and to transmit a raster image, control data, and the like (to be described later). A controller 201 includes a CPU 202, renderer 211, and image processing unit 213. An interpreter 203 of the CPU 202 interprets PDL part data of received print image data to generate intermediate language data 204. Then, a CMS 205 applies color conversion to the intermediate language data 204 using a source profile 206 and destination profile 207 to generate intermediate language data (after CMS) 210. In this case, the CMS is a color management system which executes color conversion using information of respective profiles (to be described later). The source profile 206 is required to convert a device-de pendent color space such as RGB or CMYK into a device-independent color space such as L*a*b* or XYZ. Note that XYZ is one of device-independent color spaces defined by the CIE (International Commission on Illumination), and expresses a color by three different stimulus values. The destination profile 207 is required to convert a device-independent color space into a CMYK color space depending on a device (in this case, a printer 214).

On the other hand, a CMS 208 applies color conversion to the intermediate language data 204 using a device link profile 209 to generate intermediate language data (after CMS) 210. The device link profile 209 is required to directly convert a device-dependent color space such as RGB or CMYK into a CMYK color space depending on a device (printer 214). Which of the CMS 205 and CMS 208 is selected depends on settings in the driver 222 of the PC 104. Note that this embodiment shows an example in which the CMSs are selectively used depending on the types of profiles. Alternatively, one CMS may handle a plurality of types of profiles. Also, the types of profiles are not limited to those described, in this example, and any other types of profiles may be used as long as they perform conversion into a device-dependent CMYK color space of the printer 214.

The renderer 211 generates a raster image 212 from the intermediate language data (after CMS) 210. The image processing unit 213 applies image processing to the raster image 212 or an image scanned by a scanner 218. Details of this image processing will be described later.

The printer 214 connected to the controller 201 forms an image based on output data on a print sheet using, for example, C, M, Y, and K color toners. The printer 214 has a paper feed unit 215 which feeds a print sheet, and an exhaust unit 216 which exhausts a print sheet on which an image is formed.

A display device 217 displays a user interface (UI) which shows instructions to the user and a status of the MFP 101. The scanner 218 has an auto document feeder (ADF), and can scan even a bundle of documents one by one. The scanner 218 irradiates one document image conveyed from the ADF with light coming from, a light, source (not shown), forms a document reflected image on a solid-state image sensing element such as a CCD sensor via a lens, and obtains a raster-patterned image scan signal from the solid-state image sensing element as image data. An input device 219 is an interface used to accept inputs from the user. A storage device 220 saves data processed by the controller 201, those received by the controller 201, and the like.

Image Processing Overview

The image processing in the image processing unit 213 will be described below with reference to FIG. 3. In step S301, the image processing unit 213 receives image data. The image processing unit 213 then checks in step S302 whether the received image data is scan data received from the scanner 218 or the raster image 212 sent from the driver 222 of the PC 104. If the received image data is not scan data, since it is raster image 212, the raster image 212 is that which has already been converted into a CMYK image depending on the printer 214 by the CMS 205 or 208 in the previous stage, and is used as a CMYK image 311 intact. On the other hand, if the received image data is scan data, since this image data is an RGB image 303, it undergoes the following processing to obtain a CMYK image 311. In step S304, the image processing unit 213 applies color conversion processing to the RGB image 303 to generate a common. RGB image 305. Note that the common RGB image 305 is defined, on a device-independent RGB color space, and can be converted, into another device-independent color space such as L*a*b* by calculations. Parallel to the color conversion in step S304, the image processing unit 213 executes text determination processing by detecting, for example, image edges from the RGB image 303 to generate text determination data 307 in step S306. In step S308, the image processing unit 213 applies filter processing to the common RGB image 305. In this case, the image processing unit 213 applies different filter processes to a text part and the remaining part with reference to the text determination data 307. Next, the image processing unit 213 executes undercolor removal processing in step S309, and executes RGB→CMYK color conversion processing in step S310, thereby generating an undercolor-removed CMYK image 311.

In step S312, the image processing unit 213 applies correction processing using a four-dimensional LOT (4D-LUT) required to convert CMYK data into another CMYK data to the generated or received CMYK image 311. This embodiment features generation of this 4D-LUT so as to match colors of mixed colors in a self device with those of another MFP 101. Details of the generation method of this 4D-LUT will be described later.

After the colors of the mixed colors are corrected, the image processing unit 213 corrects tone characteristics of C, M, Y, and K unicolors using one-dimensional LUTs (1D-LUTs) in step S313. Since the generation method of these 1D-LUTs can use a known method described in the related art, a description thereof will not be given. Finally, the image processing unit 213 executes image forming processing in step S314 to generate a CMYK image (binary) 315, and transmits this image data to the printer 214 in step S316.

UI Transition

As described above, this embodiment features generation of the 4D-LUT required to correct the colors of the mixed colors of the self device to match them with those of another device. The sequence of UIs required to accept instructions from the user at the time of generation of this 4D-LUT in the MFP 101a (to be referred to as a self device hereinafter) will be described below with reference to FIG. 4 and FIGS. 13 to 17. These UIs are displayed on the display device 217 under the control of the controller 201 in the MFP 101a.

Figure 13:
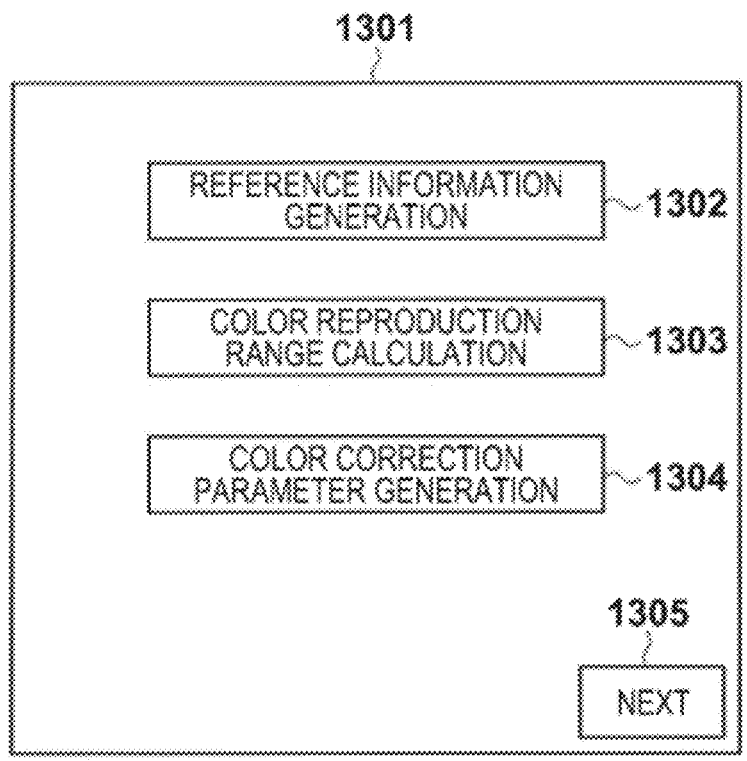
FIG. 13 shows a mode selection screen example upon generation of the 4D-LUT.

In step S401, the controller 201 displays a mode selection screen. FIG. 13 shows an example of the mode selection screen. On a UI 1301, a "reference information generation" button 1302, "color reproduction range calculation" button 1303, "color correction parameter generation" button 1304, and "next" button 1305 are displayed. When the user presses the "next" button 1305 after selection of the processing, the controller 201 receives an instruction.

When the user selects the "reference information generation" button 1302, the controller 201 judges in step S402 that reference information indicating the current color characteristics in the self device is to be generated, and displays a reference name input screen on the display device 217 in step S403 to receive a reference name input from the user. In this case, the reference information is color conversion information unique to a device, which indicates color characteristics including the mixed colors in the self device at the execution timing of reference information generation processing. More specifically, the reference information includes an L*a*b*→CMY LOT 610 (first color conversion table) which describes a correspondence relationship from a device-dependent color space to a device-independent color space, and a CMY→L*a*b* LUT 507 (second color conversion table) which describes a correspondence relationship opposite to the former LUT. When, this reference information is referred to at the time of generation processing of the 4D-LUT (third color conversion table), as will be described later, correction that can maximally reflects the color reproduction range of the self device can be executed. Since the user assigns a reference name to the reference information, a plurality of pieces of reference information generated at different times in the self device can be identified.

Figure 14:
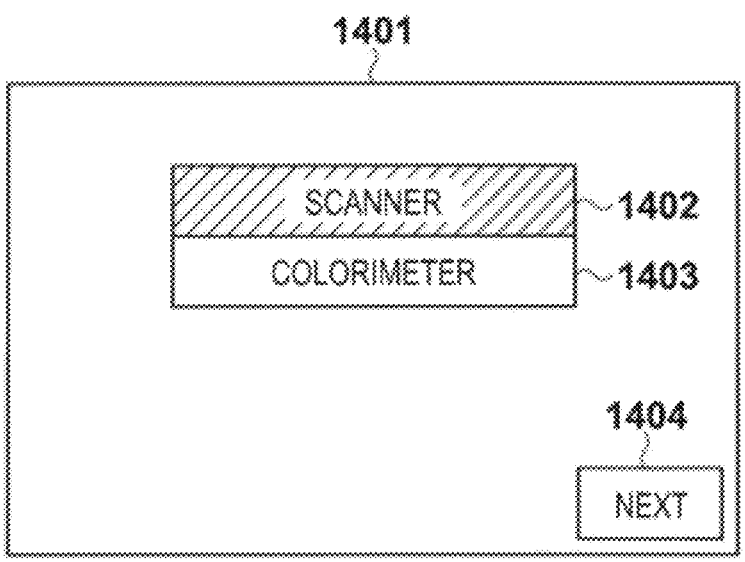
FIG. 14 shows a measuring device selection screen example.

In step S404, the controller 201 displays a measuring device selection screen required to select a measuring device used in colorimetry, and accepts an input from the user. FIG. 14 shows an example of the measuring device selection screen. As shown in FIG. 14, measuring device candidates which can attain colorimetry of a chart image are displayed on a UI 1401 in the form of a list. Names displayed in the list are associated with measuring device names connected to the self device. In this example, "scanner" 1402 and "colorimeter" 1403 are displayed in the list. The "scanner" 1402 corresponds to the scanner 218 connected, to the controller 201, and the "colorimeter" 1403 corresponds to the colorimeter 102 which can receive data from the MFP 101. In this case, the number of measuring devices displayed in the list is increased/decreased depending on the number of measuring devices connected to the self device. When the user presses a "next" button 1404 after selection from the displayed list, a measuring device used in colorimetry in this embodiment is selected, and the selected measuring device information is held in a memory (not shown). In this case, the selected measuring device is set as that to be used to read all charts in this embodiment. However, the present invention is not limited to such specific example, and a measuring device to be used may be set at, for example, every chart read timing.

In step S405, a message indicating that a chart image required to generate the reference information is output from the printer 214 is displayed, (output screen display). In response to a timing at which, for example, the user confirms an output, on the output screen display, the printer 214 outputs a chart image (chart A). After that, the display device 217 displays a colorimetric value acquisition screen in step S406 to prompt the user to acquire colorimetric values of the output chart, image using the scanner 218 or colorimeter 102. After the colorimetric values of the chart image are acquired according to the displayed message, the controller 201 generates reference information from the colorimetric values in step S407, and stores it in a reference data storage unit 408. Details of the reference information generation processing in step S407 described, above will be described later.

The reference data storage unit 408 includes color reproduction range data A (L*a*b*) 803 of the self device and common color reproduction range data (L*a*b*) 811 common to all correction performing devices including the self device in addition to the LUTs 507 and 610 as the reference color conversion information of the self device.

When the user selects neither the "reference information generation" button 1302 nor the "color reproduction range calculation" button 1303 on the mode selection screen shown in FIG. 13, the controller 201 judges in step S409 that the color reproduction range calculation processing is to be skipped, and the process jumps to step S416. Whether or not to execute color correction processing is judged in step S416. At this time, when the user does not select the "color correction parameter generation" button 1304 on the mode selection screen, the controller 201 judges in step S416 that color correction is to be skipped, thus ending the processing.

Figure 15:
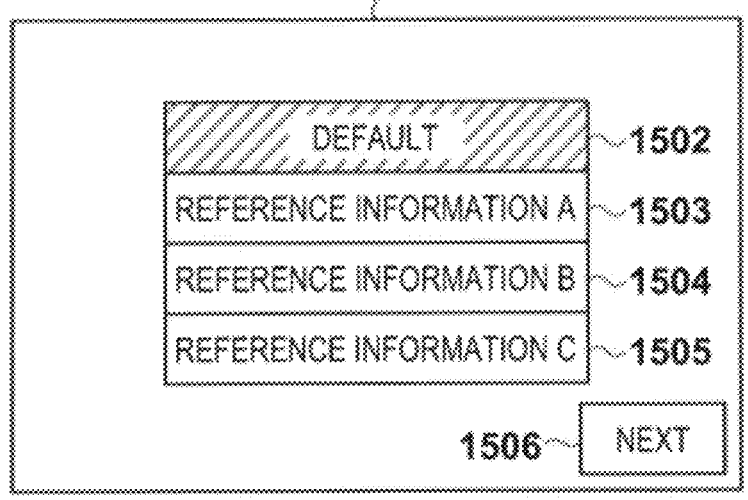
FIG. 15 shows a reference information selection screen example.

On the other hand, when the user selects the "color reproduction range calculation" button 1303 on the mode selection screen, the controller 201 judges in step S409 that calculation processing of a color reproduction range common to all correction performing devices is to be executed, and displays a reference information selection screen on the display device 217 in step S410. FIG. 15 shows an example of the reference information selection screen. As shown in FIG. 15, reference information candidates to be selected of the self device are displayed on a UI 1501 as a list, and the user can select only one information from this list. Names displayed in the list correspond to pieces of reference information in the reference data storage unit 408. In this example, "default" 1502, "reference information A" 1503, "reference information B" 1504, and "reference information C" 1505 are displayed in the list. The "default" 1502 corresponds to default reference information, which is set in advance. The "reference information A" 1503, "reference information B" 1504, and "reference information C" 1505 other than the "default" 1502 respectively correspond to pieces of reference information which were generated in accordance with user instructions in step S407 above. The number of pieces of reference information displayed in the list is increased when the reference information generation processing (S407) is executed according to a user instruction. Note that the default, reference information is that including representative values of the self device (for example, ideal values used at the time of development). The reference information selected in step S410 is held, in association with color reproduction range information to be calculated in step S415, and is referred to in subsequent color correction parameter generation processing (S422).

When the user presses a "next" button 1506 after selection of one reference information from the displayed list, the display device 211 displays a color reproduction range name input screen in step S411 to accept a color reproduction range name input from the user. The color reproduction range name input in this step is associated with the reference information selected in step S410.

Figure 16:
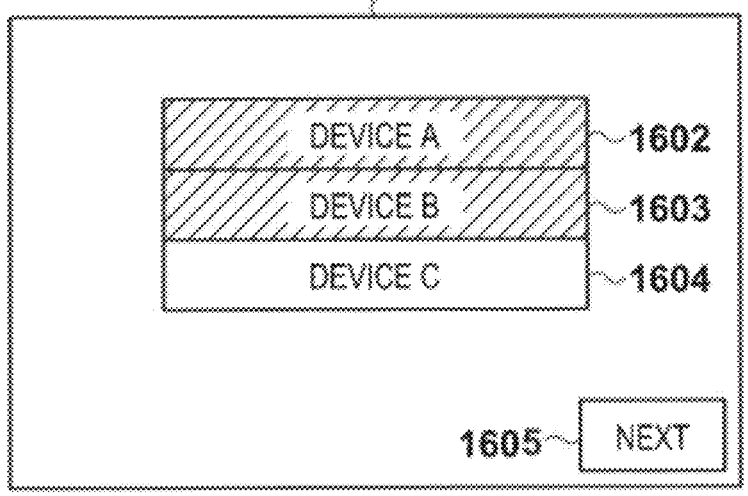
FIG. 16 shows a correction performing device selection screen example.

In step S412, the controller 201 displays a correction performing device selection screen. FIG. 16 shows an example of the correction performing device selection screen. As shown in FIG. 16, candidates of correction performing devices are displayed as a list on a UI 1601. Device names (device A 1602, device B 1603, and device C 1604) displayed in the list respectively correspond to the plurality of MFPs 101 connected via the network 105, and the user can select a plurality of devices. The number of correction performing devices displayed in the list is increased/decreased according to the number of MFPs 101 connected via the network 105.

The user can select a plurality of devices from the correction performing device candidates displayed, in the list. When the user presses a "next" button 1605 after selection of at least one device, the correction performing device selection processing ends. In step S413, the controller 201 then displays a message indicating that a chart image required to generate color reproduction range information is output from the printer 214 (output screen display). In response to a timing at which, for example, the user confirms outputting on the output screen display, the printer 211 outputs a chart image. The chart image (chart B) output in this case is different from the chart image (chart A) used to generate the reference information, which image is output in step S405. After that, in step S414, the display device 217 displays the colorimetric value acquisitions screen to prompt the user to acquire colorimetric values of the output chart image using the scanner 218 or colorimeter 102.

After the colorimetric values of the chart image are acquired according to the displayed, message, the controller 201 calculates a color reproduction range of the self device and a color reproduction range common to the selected correction performing devices from, the acquired colorimetric values in step S415. As a result, color reproduction range information, (color reproduction range data A (L*a*b*) 805 and common color reproduction range data (L*a*b*) 811) is generated. The color reproduction range information generated in this step is stored in the reference data storage unit 408 in association with the reference information selected in step S410, the color reproduction range name input in step S411, and the correction performing devices selected, in step S412. That, is, a plurality of pieces of color reproduction range information are generated with respect to arbitrary one reference information in accordance with a combination of correction performing devices. Details of the color reproduction range calculation processing in step S415 described above will be described later.

After the color reproduction range calculation processing in step S415, the process advances to step S416, and the controller 201 determines whether or not to execute color correction processing. When the user selects the "color correction parameter generation" button 1304 on the mode selection screen shown in FIG. 13, the controller 201 judges that the color correction processing is to be executed, and starts generation processing of color correction parameters (4D-LUT) to be referred to upon execution of color correction in the self device. In this case, the process advances to step S417, and the controller 201 displays a reference information selection screen on the display device 217 to prompt the user to set color information to be matched by the self device. Since this reference information selection screen is the same as that (FIG. 15) displayed in step S410, a detailed description thereof will not be repeated. The "default" 1502 corresponds to that including representative values of the self device, which is set in advance. When the user selects this information, color correction using the reference information as representative values is executed. On the other hand, the "reference information A" 1503, "reference information B" 1504, and "reference information C" 1505 other than the "default" 1502 correspond to pieces of reference information of the self device, which were generated according to user instructions. When the user selects this information, color correction using the generated reference information is executed.

Figure 17:
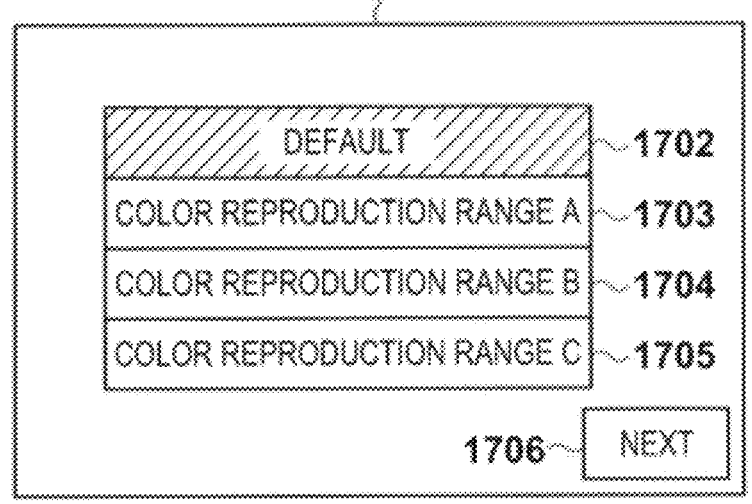
FIG. 17 shows a color reproduction range selection screen example.

After selection of one reference information from the displayed list, the controller 201 displays a color reproduction range selection screen according to the selected reference information on the display device 217 in step S418, FIG. 17 shows an example of the color reproduction range selection screen. On a UI 1701 shown in FIG. 17, the common color reproduction range data (L*a*b*) 811 according to the reference information selected in step S417 are read out from the reference data storage unit 408, and are displayed in a list as color reproduction range candidates as color matching targets. Names displayed at this time correspond to the color reproduction range names set according to user instructions in step S411. In this example, "default" 1702, "color reproduction range A" 1703, "color reproduction range B" 1704ƒ and "color reproduction range C" 1705 are displayed in the list, and the user can select only one range. The number of color reproduction ranges displayed in the list is increased when the color reproduction range calculation processing (S415) is executed, in accordance with a user instruction. Note that the "default" 1702 corresponds to a common color reproduction range as representative values of the self device, which range is set in advance, and is displayed as an option irrespective of the reference information selected, in step S417. When the user selects this "default" 1702, color correction to be matched with the common color reproduction range is executed. On the other hand, the "color reproduction range A," 1703, "color reproduction range B" 1704, and "color reproduction range C" 1705 respectively correspond, to common color reproduction ranges calculated according to user instructions. When the user selects one of these ranges, color correction is executed to have that common color reproduction range as a target.

When the user presses a "next" button 1706 after selection of one color reproduction range from the displayed list, the color reproduction range common to the correction performing devices is selected, and the controller 201 displays a correction target device selection screen on the display device 217 in step S419. The correction target device selection screen displays devices as correction target device candidates in a list in the same manner as in the correction performing device selection screen example shown in FIG. 16. Names displayed at this time are associated with the MFPs 101 selected in step S412 as correction performing devices corresponding to the color reproduction range selected in step S418, and one of the devices is selected as a color matching target device of all the correction, performing devices.

After selection of one of the correction target device candidates displayed in the list, the controller 201 displays a message indicating that a chart image required to generate color correction parameters is output from the printer 214 (output screen display) in step S420. In response to a timing at which, for example, the user confirms outputting on the output screen display, the printer 214 outputs a chart image. The chart image (chart C) is different from the chart images (charts A and B) output in steps S405 and S413 above, and details of this chart image will be described later. After that, the display device 217 displays the calorimetric value acquisition screen in step S421 to prompt the user to acquire colorimetric values of the output chart image using the scanner 218 or colorimeter 102.

After the colorimetric values of the chart image are acquired according to the displayed message, the controller 201 generates color correction parameters (4D-LUT) of the self device using the acquired colorimetric values and reference information in step S422. That is, when the self device executes correction using the generated 4D-LUT, colors within the color reproduction range selected in step S418 can be corrected to be matched with those in the correction target, device. Details of the color correction parameter generation processing in step S422 described above will be described later.

Reference Information Generation Processing (S407)

In this embodiment, the 3D-LUT 507 required to convert CMY data into L*a*b* data and the 3D-LUT 510 required, to convert L*a*b* data into CMY data are generated as the reference information in the self device. The sequence of the reference information generation processing to be executed in step S407 will be described in detail below with reference to FIGS. 5 to 7 and FIG. 27. Note that this reference information generation processing is controlled by the controller 201 in the self device (MFP 101a).

Figure 5:
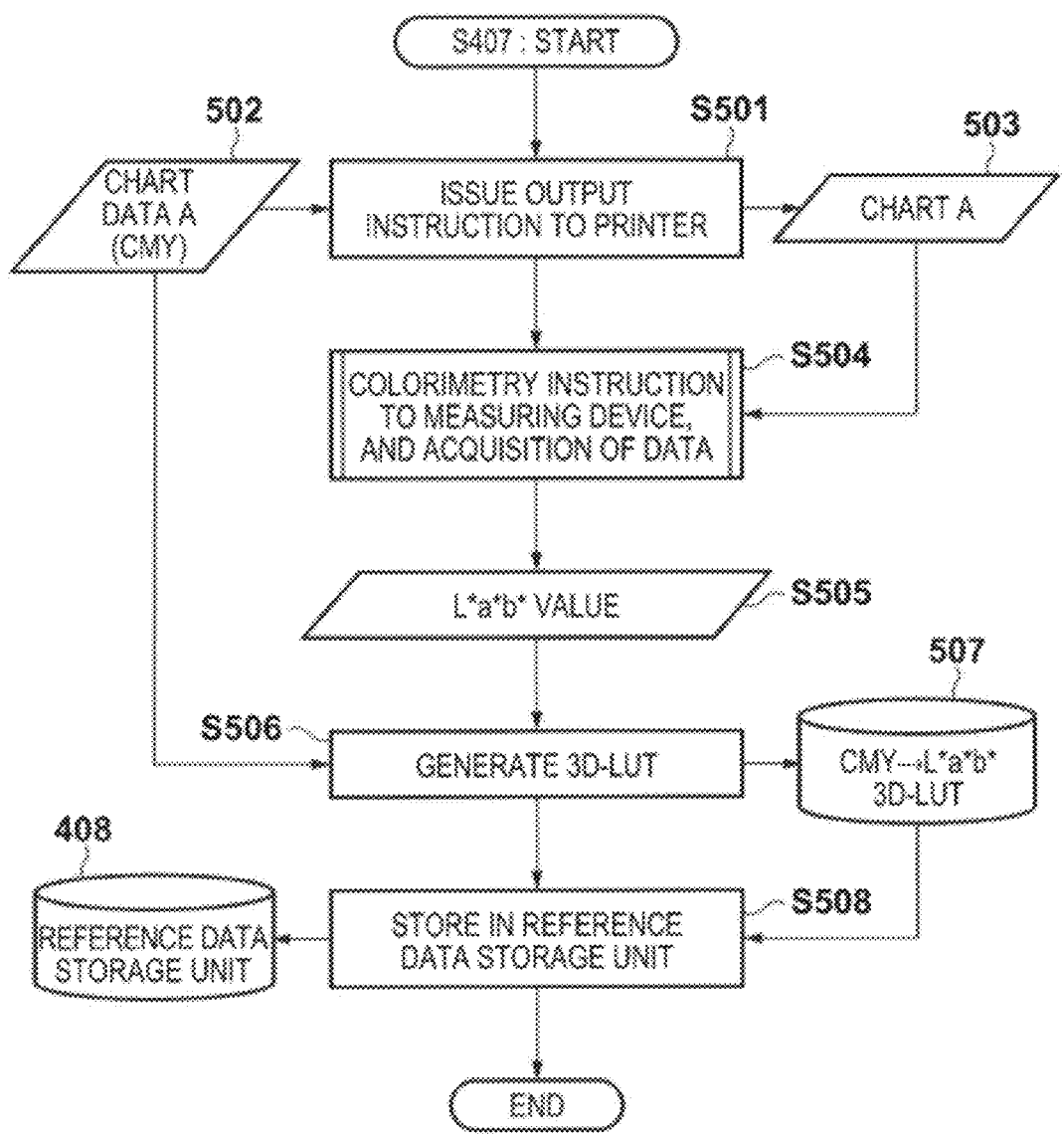
FIG. 5 is a flowchart showing processing for generating a CMY→L*a*b 3D-LUT.
Figure 18:
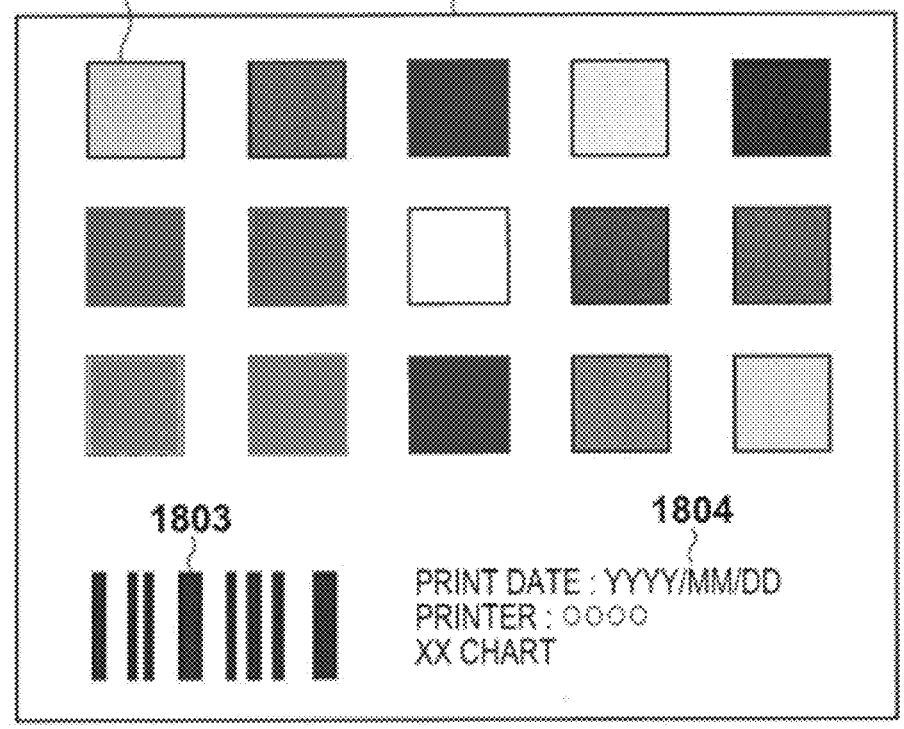
FIG. 18 shows a chart, example.

FIG. 5 shows the sequence of processing for generating the CMY L*a*b* 3D-LUT 507, in step S501, the controller 201 loads chart data A (CMY) 502 to control the image processing unit 213 to execute processing, and transmits the processed data, to the printer 214, thus out putting a chart A 503. In this case, the chart data A (CMY) 502 is obtained, by changing CMY tones at uniform intervals, and when, all tones are divided into 8, the chart data A includes 8×8×8=512 data, FIG. 18 shows an example of the chart A 503 based on this chart data A (CMY) 502. In FIG. 18, each individual data is expressed as rectangle data 1802 having a given size on a sheet 1801, and a barcode 1803 and text information 1804 are also expressed on a space without any rectangle data 1802. This rectangle data will be referred, to as patch data or a patch hereinafter. In case of 512 data, 512 patch data 1802 exist. The barcode 1803 is used to allow the device to identify information such as an output date by the printer, an output printer name, and a chart name when this barcode is scanned by the scanner. The text information 1804 expresses the same information as the barcode 1803 on the sheet 1801 by means of text. In step S504, the chart. A 503 undergoes colorimetry using the measuring device (scanner 218 or colorimeter 102) selected in step S404 to obtain. L*a*b* values 505. Details of this chart colorimetric value acquisition method will be described later. The controller 201 generates the CMY→L*a*b* 3D-LUT 507 using the acquired L*a*b* values 505 and the chart data A (CMY) 502 in step S506, and stores the generated LUT in the reference data storage unit 408 in step S508. Note that the 3D-LUT indicates an LUT which has three dimensions corresponding to three colors C, M, and Y on the input side.

Figure 6:
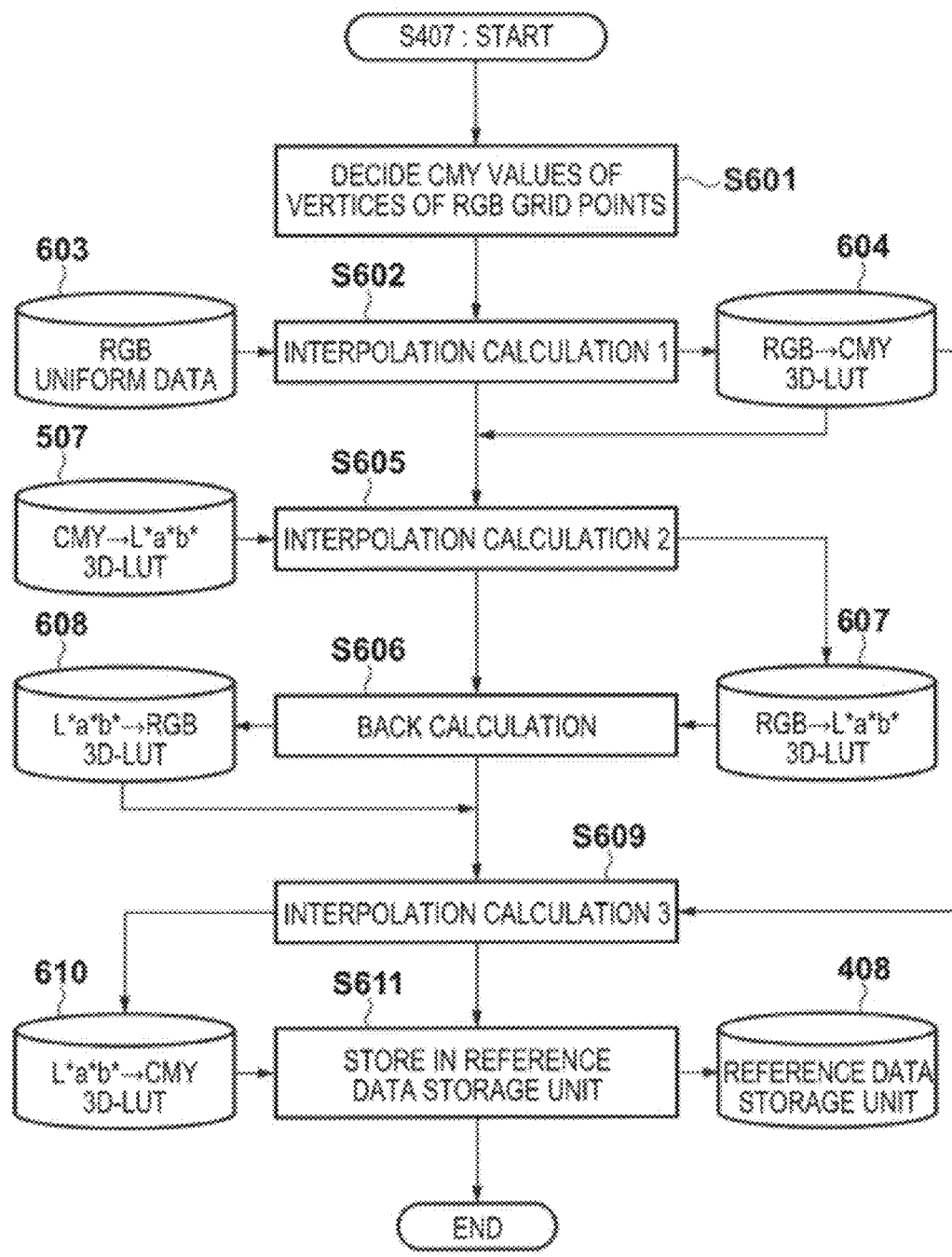
FIG. 6 is a flowchart showing processing for generating an L*a*b*→CMY 3D-LUT.
Figure 7:
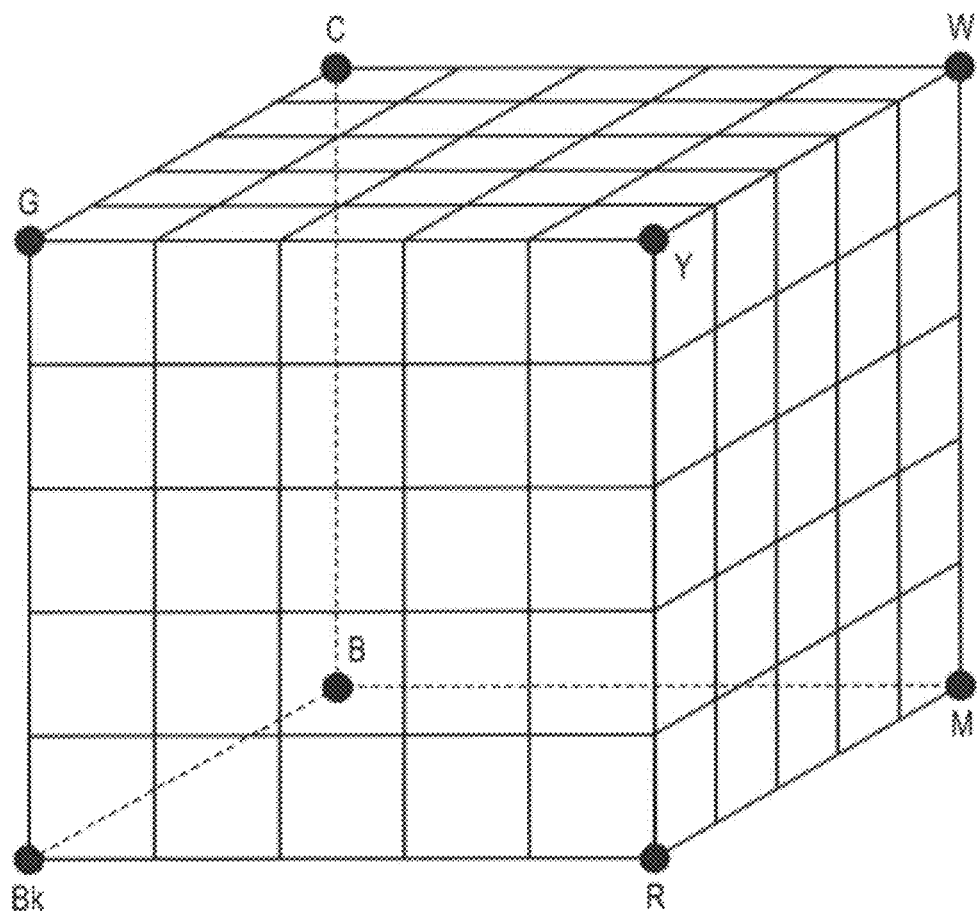
FIG. 7 is a view showing grid points on an RGB color space.

FIG. 6 shows the sequence of processing for generating the L*a*b*→CMY 3D-LUT 610. This processing is executed after the generation processing of the CMY→L*a*b*→3D-LUT 507 shown in FIG. 5 above. In step S601, the controller 201 determines CMY values corresponding to vertices of grid points on an RGB color space shown in FIG. 7. On the RGB color space shown in FIG. 7, data are uniformly divided in correspondence with respective RGB colors, and this space corresponds to the input side of an RGB→CMY 3D-LUT 604 (to be described later), that is, the RGB side. This RGB space includes vertices corresponding to R (Red), G (Green), B (Blue), C (Cyan), M (Magenta), Y (Yellow), Bk (Black), and W (White). In step S601, CMY values corresponding to these vertices are determined. For example, a CMY value corresponding to the R vertex is (C, M, Y)=(0, 255, 255). Since corresponding CMY values depend on the characteristics of the printer 214, they do not always assume the same values. For example, combinations of CMY values corresponding to a highest saturation level are selected for R, G, B, C, M, and Y, and a combination of CMY values corresponding to a lowest lightness level is selected for Bk. Note that the combination of CMY values may be arbitrarily selected.

In step S602, the controller 201 generates the RGB→CMY LUT 604 by a known interpolation calculation method using RGB uniform data 603, which are prepared in advance and correspond to grid points, and the CMY values of the vertices of the RGB color space. In step S605, the controller 201 calculates an RGB→L*a*b* 3D-LUT 607 by known interpolation calculations using the CMY→L*a*b* 3D-LUT 507 generated, by the method shown in FIG. 5 for output values of the RGB→CMY 3D-LUT 604, that is, CMY values. In step S606, the controller 201 generates an L*a*b*→RGB 3D-LUT 608 by making back calculations based, on the known calculation method from the RGB→L*a*b* 3D-LUT 607. In step S609, the controller 201 makes interpolation calculations using the RGB→CMY 3D-LUT 604 for output values of the L*a*b*→RGB 3D-LUT 608, that is, RGB values, thereby generating the L*a*b*→CMY 3D-LUT 610. In step S611, the controller 201 stores the generated L*a*b*→CMY 3D-LUT 610 in the reference data storage unit 408.

Chart Colorimetric Value Acquisition Processing (S504)

Figure 27:
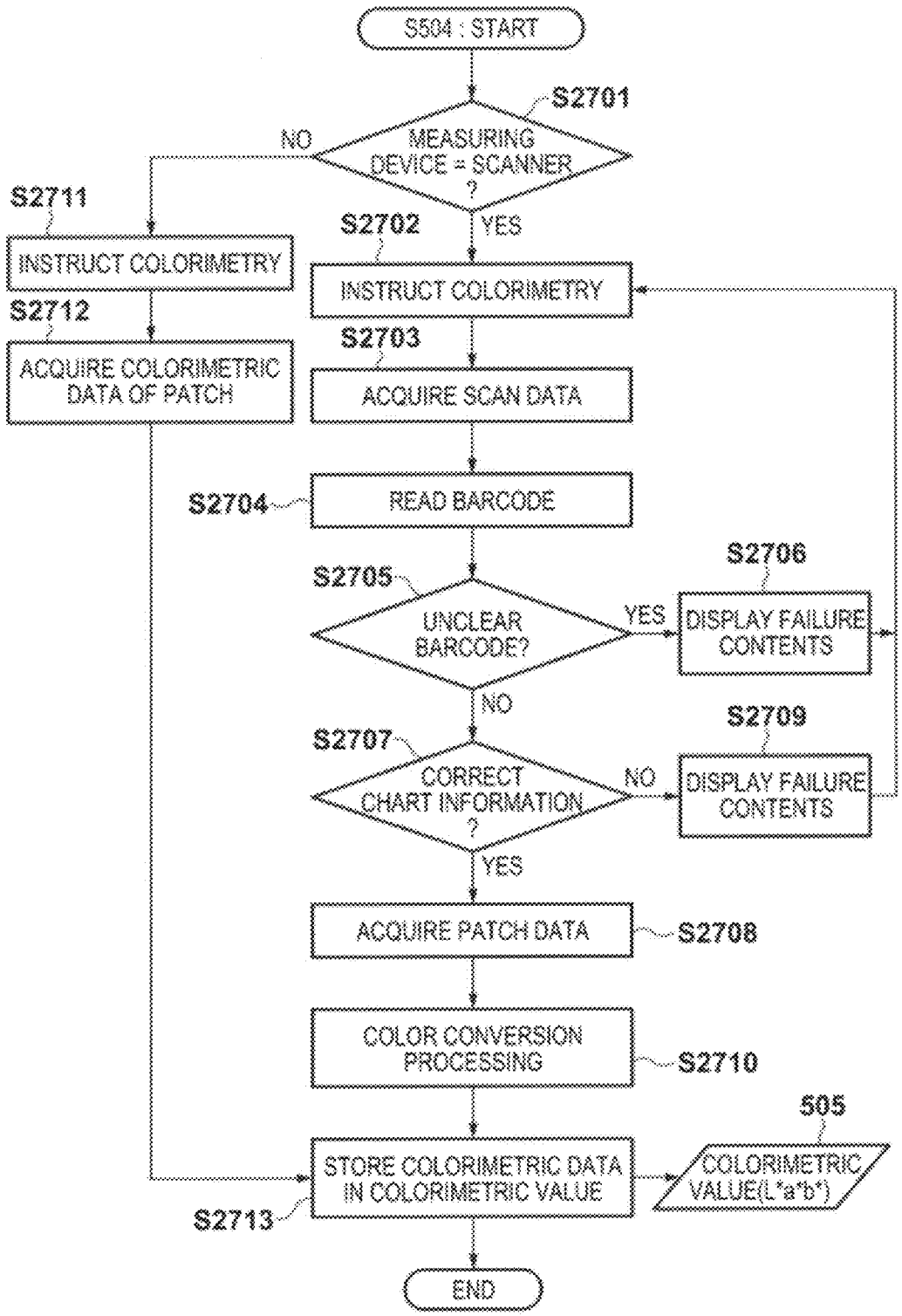
FIG. 27 is a flowchart showing acquisition processing of chart colorimetric values.

The processing for acquiring chart colorimetric values (L*a*b* values 505) by executing colorimetry-processing of the chart A 503 in step S504 above will be described in detail below with reference to FIG. 27.

The controller 201 determines in step S2701 whether or not the measuring device selected, in step S404 is the scanner. If the measuring device is the scanner, the controller 201 displays, on the display device 217, a colorimetry instruction using the scanner for the user in step S2702. At this time, the controller 201 also displays the text information 1804 which indicates a type of chart to be scanned, output device, date and time, and the like on the chart A 503. The controller 201 acquires scan data of the chart A 503 using the scanner 218 in step S2703, and reads a barcode image corresponding to the barcode 1803 shown in FIG. 18 from the scan data in step S2704. If the controller 201 determines in step S2705 that the barcode image read in step S2704 is unclear, and information of the chart image cannot be acquired, it displays a message indicating that the barcode image is unclear on the display device 217 in step S2706. Then, the controller 201 repeats a colorimetry instruction using the scanner in step S2702. If the acquired barcode image is clear, the controller 201 acquires chart information from the barcode image in step S2707, and judges whether or not the chart A 503 is an appropriate chart image. For example, as the confirmation method, of the appropriate chart image, whether or not the acquired chart information of the scan image and the text information 1804 displayed in step S2702 indicate the same chart image may be checked. If it is determined, in step S2707 that the chart information is correct, the controller 201 acquires patch data from the scanned image in step S2708. In step S2710, the controller 201 executes color conversion processing from RGB values of the patch data into L*a*b* values, thus acquiring colorimetric data.

On the other hand, if the measuring device used in colorimetry is the colorimeter in step S2701, the controller 201 displays, on the display device 217, a colorimetry instruction using the colorimeter for the user in step S2711. In step S2712, the user measures colors of respective patches on the chart A 503 using the colorimeter 102, thus acquiring L*a*b* colorimetric data.

Then, in step S2713, the controller 201 obtains the L*a*b* colorimetric data obtained by the scanner 213 or colorimeter 102 as colorimetric values (L*a*b*) 2714. In step S504 above, these colorimetric values (L*a*b*) 2714 are output as the L*a*b* values 505 obtained, by executing the colorimetry processing of the chart image. Note that the present invention is not limited to the aforementioned example, and may use any other methods as long as they can discriminate information of a chart image.

Color Reproduction Range Calculation Processing (S415)

In this embodiment, the color reproduction range data A (L*a*b*) 805 as the color reproduction range information of the self device and the common color reproduction range data (L*a*b*) 811 as the color reproduction range common to the plurality of correction performing devices are calculated. The sequence of the color reproduction range information calculation processing executed in step S415 will be described in detail below with reference to FIGS. 8 and 9. Note that this color reproduction range calculation processing is controlled by the controller 201.

Figure 8:
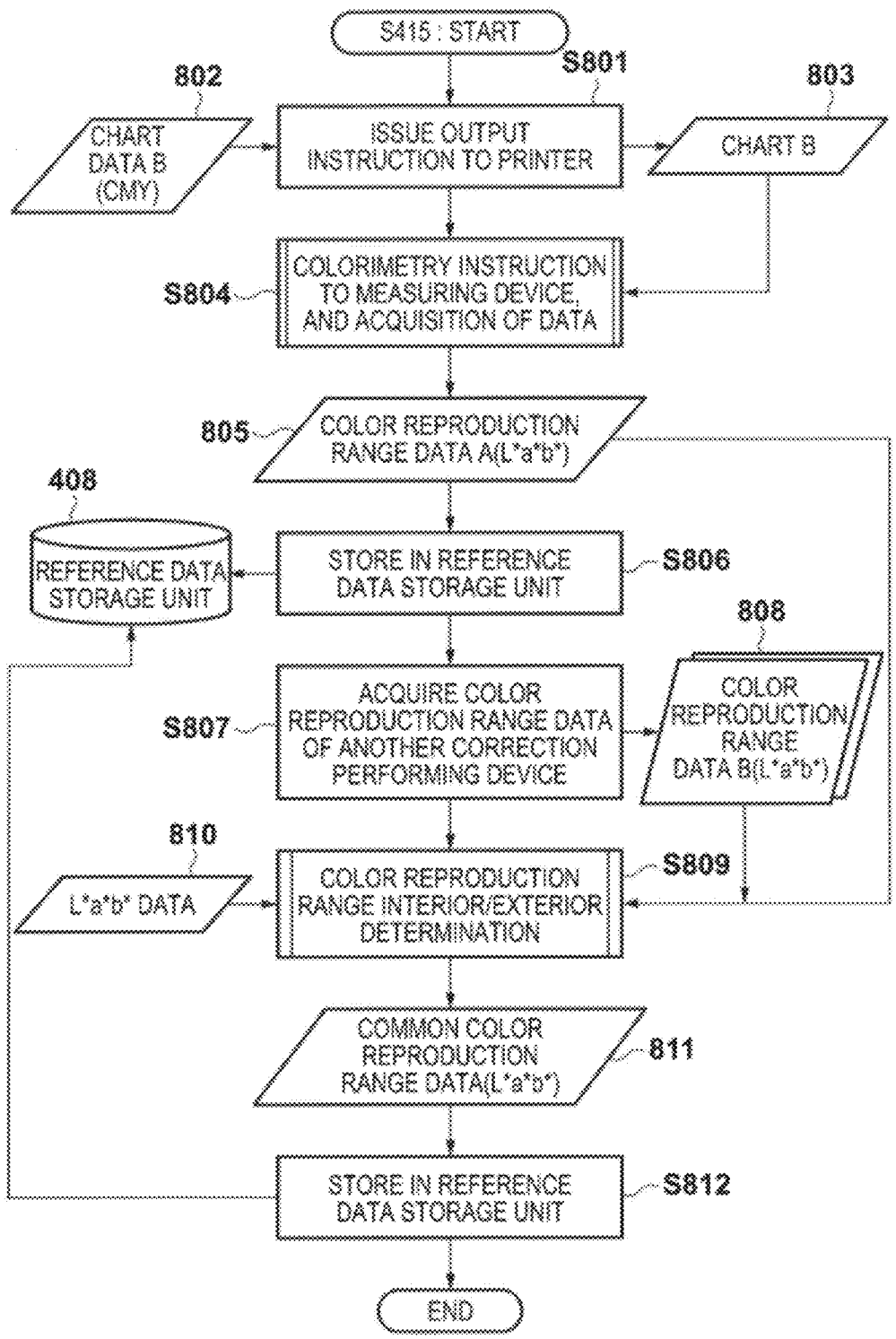
FIG. 8 is a flowchart showing processing for generating color reproduction range data of a self device and common color reproduction range data.

FIG. 8 shows the sequence of the processing for generating the color reproduction range information (color reproduction range data A (L*a*b*) 805 and common color reproduction range data (L*a*b*) 811). In step S801, the controller 201 loads chart data B (CMY) 802 to control the image processing unit 213 to execute processing, and transmits the processed data to the printer 214, thus outputting a chart B 803. Note that the chart data B (CMY) 802 can have an arbitrary structure as long as they can express the color reproduction range of that device. Also, the chart B 803 is output to have, for example, the same format as in FIG. 18 described above.

In step S804, the controller 201 executes first color reproduction range acquisition processing. That is, the controller 201 acquires colorimetric values of the chart B 803 using the scanner 218 or colorimeter 102, thus obtaining color reproduction range data A (L*a*b*) 805 (first color reproduction range data) which represents the color reproduction range of the corresponding device. Since this processing is the same as that in FIG. 27 for acquiring the colorimetric values of the chart A 503, a description thereof will not be repeated. The calculated color reproduction range data A (L*a*b*) 305 is color reproduction range information of the MFP 101 itself, which is being currently processed. Then, in step S806, the controller 201 stores the acquired color reproduction range data A (L*a*b*) 805 in the reference data storage unit 408.

In step S807, the controller 201 acquires color reproduction range data B (L*a*b*) 808 (second color reproduction range data) for each of other MFPs 101 (to be referred to as other devices hereinafter), which are selected as the correction performing devices in step S412. The color reproduction range data B (L*a*b*) 808 to be acquired of the other device is the color reproduction range data A (L*a*b*) 805, which is acquired in that device, as described above. As a method used when the self device (for example, MFP 101a) acquires the color reproduction range data B (L*a*b*) 308 of the other device (for example, MFP 101b), two examples will be described below. In the first method, the controller 201 of the MFP 101a transmits chart data B (CMY) 802 using the network I/F 221. Then, the controller 201 of the MFP 101b receives the chart data B (CMY) 802 using the network I/F 221, and the printer 214 of the MFP 101b outputs this data to obtain the chart B 803. After that, the colorimetric values of the chart B 803 are acquired using the scanner 218 of the MFP 101a or colorimeter 102. In the second method, the color reproduction range data A (L*a*b*) 805 of the MFP 101b is acquired from the reference data storage unit 408 of the MFP 101b, and the controller 201 of the MFP 101b transmits this data using the network I/F 221. Then, the controller 201 of the MFP 101a receives the transmitted color reproduction range data A (L*a*b*) as the color reproduction range data. B (L*a*b*) 808 of the MFP 101b using the network I/F 221. The present invention is not limited, to the above examples, and may use any other methods as long as the self device can acquire the color reproduction range data 3 (L*a*b*) 808 of the other device.

In step S809, the controller 201 executes color reproduction range interior/exterior determination processing using the color reproduction range data A (L*a*b*) 805 of the self device, the color reproduction range data B (L*a*b*) 808 of other correction performing devices, and predetermined. L*a*b* data 810. As a result of this color reproduction range interior/exterior determination processing, common color reproduction range data (L*a*b*) 811 indicating a color reproduction range common to all correction performing devices is generated; and details of this processing will be described later. Note that the L*a*b* data 810 are data which define an arbitrary number of data from huge combinations of L*a*b* data, and are, for example, uniform data divided at given intervals.

In step S812, the controller 201 stores the acquired common color reproduction range data (L*a*b*) 811 in the reference data storage unit 408. At this time, the common color reproduction range data (L*a*b*) 811 is stored in association with the reference information selected in step S410, the color reproduction range name input in step S411, and the correction performing devices selected, in step S412.

Color Reproduction Range Interior/Exterior Determination Processing (S809)

Figure 9:
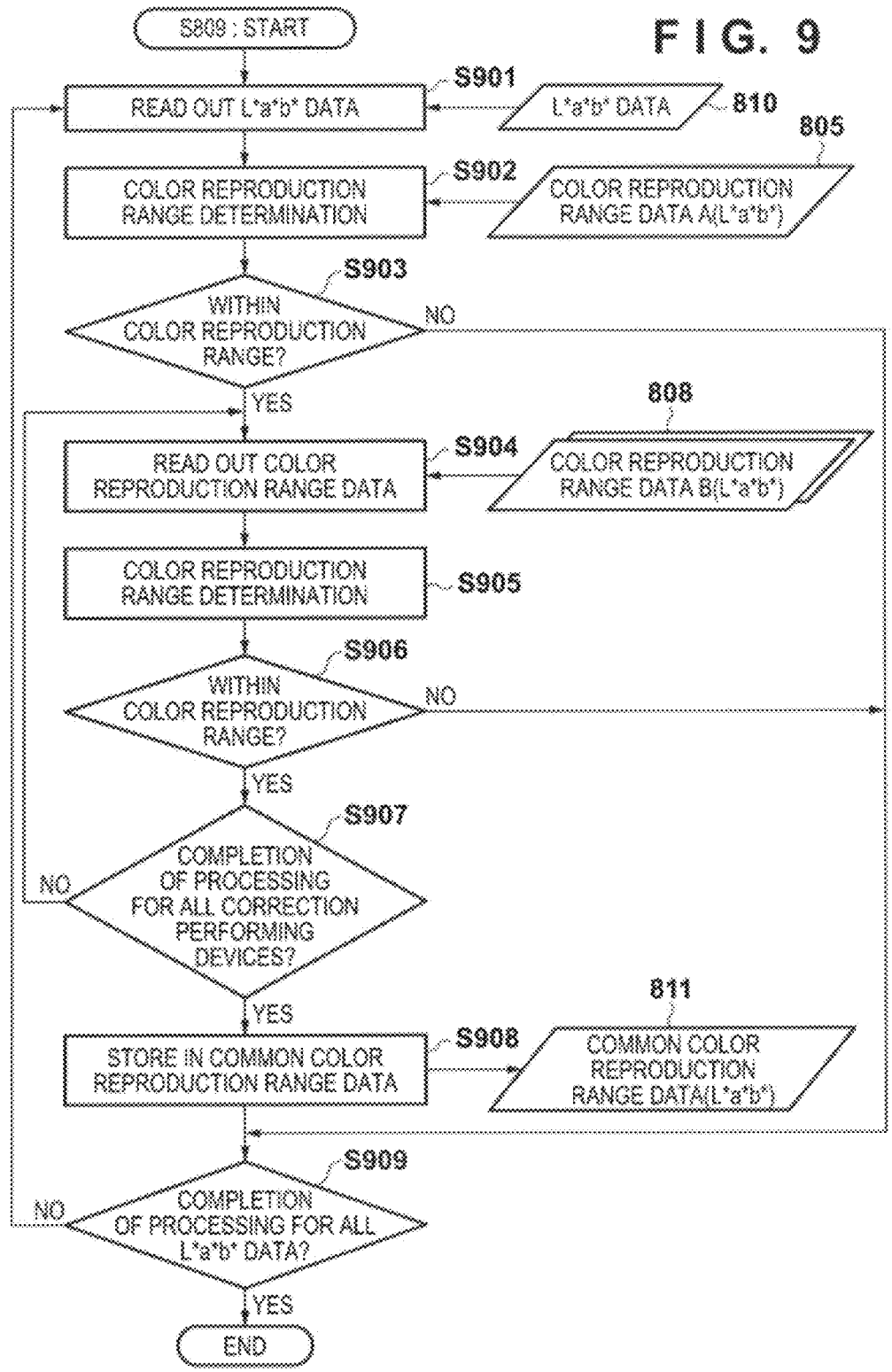
FIG. 9 is a flowchart showing color reproduction range interior/exterior determination processing.

Details of the color reproduction range interior/exterior determination processing in step S809 above, that is, the common color reproduction range generation processing will be described below with reference to FIG. 9. In step S901, the controller 201 reads out the L*a*b* data 810 as data of interest on a device-independent color space. In step S902, the controller 201 executes first color reproduction range determination processing. That is, the controller 201 determines whether or not the L*a*b* data 810 read out in step S901 falls within the color reproduction range of the self device indicated by the color reproduction range data A (L*a*b*) 805. As this determination method, an existing method described in, for example, Japanese Patent No. 3566850 can be used. According to this method, when a color reproduction range of a device is defined by eight points R, G, B, C, M, Y, Bk, and W, these eight points are converted into L*a*b* values. Then, the color reproduction range of the device is approximated, by a dodecahedron formed by the six points R, G, B, C, M, and Y, and Bk and W ridges, and it is determined that, a point which exists inside the color reproduction range of the device with respect, to the formed, dodecahedron falls within the color reproduction range. Therefore, when data of the chart data B (CMY) 802 are patches which express R, G, B, C, M, Y, Bk, and W, the device color reproduction range can be approximated by the dodecahedron from, the color reproduction range data A (L*a*b*) 805. Therefore, the interior/exterior determination of the device color reproduction range can be executed, for the L*a*b* data 810.

If it is determined in step S903 that the L*a*b* data 810 falls outside the color reproduction range of the self device, the controller 201 determined in step S909 whether or not all the L*a*b* data 810 have been processed. On the other hand, if it is determined in step S903 that the L*a*b* data 810 falls within the color reproduction range of the self device, the process advances to step S904 to read out the color reproduction range data B (L*a*b*) 808 for one of the correction performing devices other than the self device. The controller 201 then determines in step S905 whether or not the L*a*b* data 810 falls within a color reproduction range indicated by the color reproduction range data B (L*a*b*) 808 read out in step S904.

Note that the color reproduction range acquisition processing in step S904 and the color reproduction range determination processing in step S905 are those for acquiring and determining color reproduction ranges of devices other than the self device of all the correction performing devices. In this embodiment, of all the correction performing devices, the self device is defined as a first output device, a correction target device is defined as a second output device, and the other correction performing device is defined as a third output device for the sake of simplicity. Then, this embodiment aims at matching colors of an output image within the color reproduction range common to the second and third output devices with those of the second output device in the first output device. Therefore, step S904 above is roughly classified into second color reproduction range acquisition processing for acquiring a color reproduction range of the second output, device, and third color reproduction range acquisition processing for acquiring a color reproduction range of the third output device. Likewise, step S905 above is roughly classified, into second, color reproduction range determination processing for determining a color reproduction range of the second output device, and third color reproduction range determination processing for determining a color reproduction range of the third output device.

If it is determined in step S906 chat the L*a*b* data 810 falls outside the color reproduction range of the correction performing device, the controller 201 determines in step S909 whether or not all the L*a*b* data 810 have been processed. On the other hand, if it is determined, in step S906 that, the L*a*b* data 810 falls within the color reproduction range of the correction performing device, the controller 201 determines in step S907 whether or not the color reproduction range determination processing is complete for all the correction performing devices. If a correction performing device to be processed still remains, the process returns to step S904, and the color reproduction range data B (L*a*b*) 808 of the correction performing device to be processed is read out to repeat the processing. On the other hand, if it is determined in step S907 that the processing is complete for all the correction performing devices, the L*a*b* data 810 is set as common color reproduction range data (L*a*b) 811 in step S908.

After that, the controller 201 determines in step S909 whether or not all the L*a*t data 810 have been processed. If data to be processed still remain, the next L*a*b* data 810 is read out to repeat the processing. If it is determined, that all the L*a*b* data 810 have been processed, the color reproduction range interior/exterior determination ends, thus completing the common color reproduction range data (L*a*b*) 811 including the L*a*b* data 810 which are determined, to fall within the color reproduction ranges for all the correction performing devices. That is, the common color reproduction range data (L*a*b*) 811 represents a color reproduction range common to all the correction performing devices.

The common color reproduction range data (L*a*b*) 811 generated in this way correspond to an overlapping portion of color reproduction ranges indicated by the following color reproduction range data: a color reproduction range of the self device indicated by the first color reproduction range data (color reproduction range data A (L*a*b*) 805 of the self device); a color reproduction range of the correction target device indicated by the second color reproduction range data (color reproduction range data B (L*a*b*) 808 of the correction target device); and a color reproduction range of the correction performing device other than the self device and the correction target device, which range is indicated by the third color reproduction range data (color reproduction range data B (L*a*b*) 808 of the other device).

Color Correction Parameter Generation Processing (S422)

In this embodiment, the 4D-LUT is generated as parameters required to execute the color correction which matches colors of an output image within the color reproduction range common to the plurality of correction performing devices with those of the correction target device selected, as a correction target in the self device. Details of the color correction parameter generation processing in step S422 will be described below with reference to FIGS. 10 to 12. Note that this color correction parameter generation processing is controlled by the controller 201 of the self device (MFP 101a).

Figure 10:
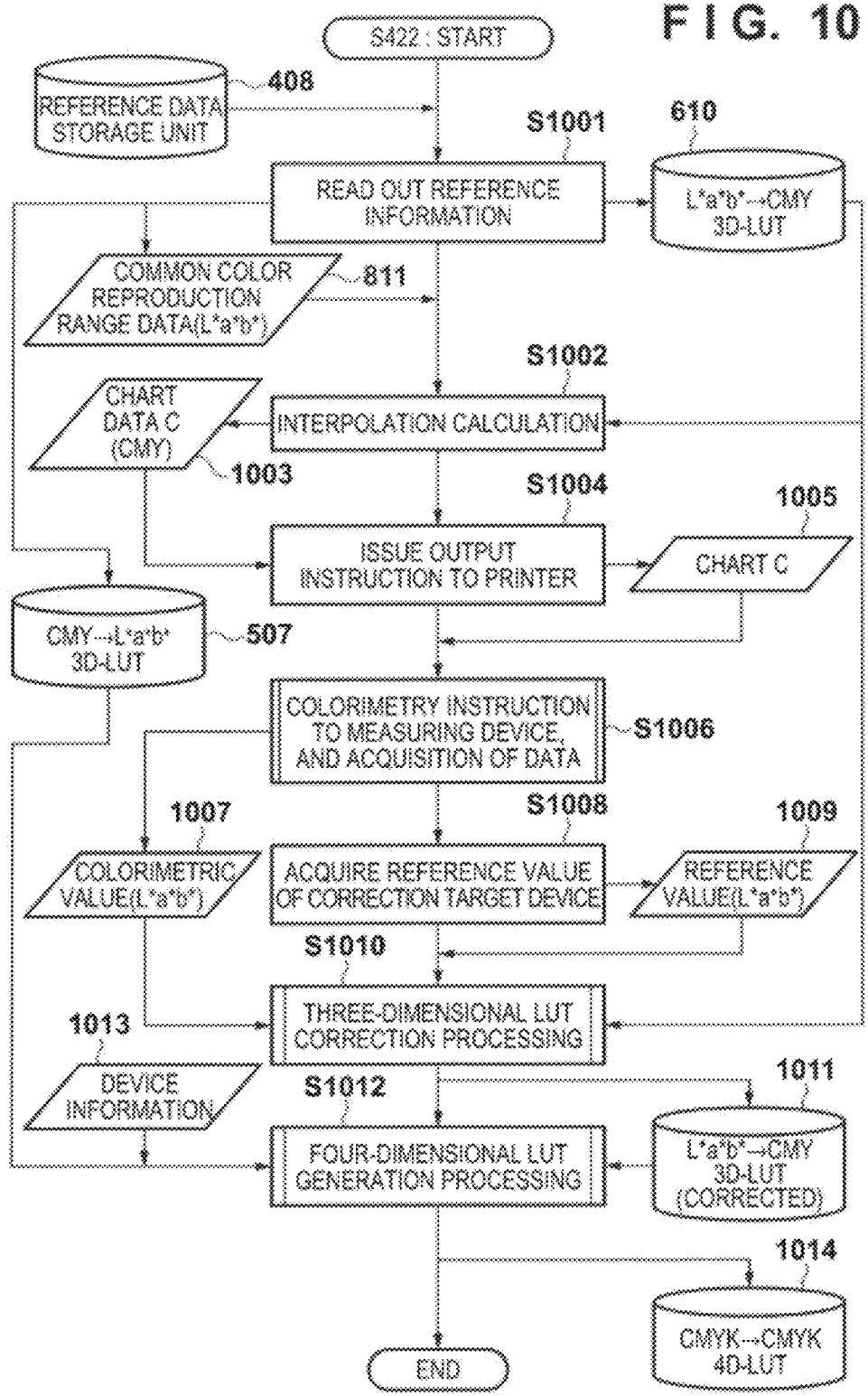
FIG. 10 is a flowchart showing processing for generating color correction parameters.

FIG. 10 shows the sequence of processing for generating the four-dimensional LUT (4D-LUT) required to convert. CMYK data into another CMYK data as color correction parameters to be referred to at the time of the color correction executed by the image processing unit 218 in step S312 above. In step S1001, the controller 201 acquires the CMY→L*a*b* 3D-LUT 507 and L*a*b*→CMY 3D-LUT 610 as correction target, reference information, which is selected from the reference information selection screen in step S417, from the reference data storage unit 408. In step S1001, the controller 201 further acquires the common color reproduction range data (L*a*b*) 811 as a correction target color reproduction range, which is selected from the color reproduction range selection screen in step S418.

In step S1002, the controller 201 executes chart data generation processing for the self device. That is, the controller 201 converts the common color reproduction range data (L*a*b*) 811 by interpolation calculations using the L*a*b*→CMY 3D-LUT 610 acquired, in step S1001, thereby generating chart data C (CMY) 1003. This chart data C (CMY) 1003 includes unique CMY values optimal to the self device, which values fall within the color reproduction range common to all the correction performing devices.

In step S1004, the controller 201 controls the image processing unit 213 to process the chart data C (CMY) 1003, and transmits the processed data to the printer 214, thus outputting a chart C 1005. In step S1006, the controller 201 acquires colorimetric values (L*a*b*) 1007 of the chart C 1005 using the scanner 218 or colorimeter 102. In this case, the chart C 1005 is output to have the same format as in, for example. FIG. 18 described above, and a detailed description thereof will not be repeated. Also, since the sequence of the colorimetric value acquisition processing in step S1006 is the same as that in FIG. 27, a description thereof will not be repeated.

In step S1008, the controller 201 acquires reference values (L*a*b*) 1009 of the correction target device selected in step S419. Note that the reference values (L*a*b*) 1009 indicate values obtained by generating a chart image corresponding to the common color reproduction range data (L*a*b*) 811 and measuring colors of that chart image in the correction target device. As the reference value acquisition processing method, three examples when, for example, the MFP 101a as the self device acquires the reference values (L*a*b*) 1009 of the MFP 101b as the correction target device will be explained. In the first method, the controller 201 of the MFP 101a transmits the common color reproduction range data (L*a*b*) 811 to the MFP 101b using the network I/F 221. Then, the controller 201 of the MFP 101b makes interpolation calculations using the L*a*b*→CMY 3D-LUT 610 stored in the self reference data storage unit 408 and the received common color reproduction range data (L*a*b*) 811, thus generating chart data. The chart data is then output, from the printer 214 of the MFP 101b to obtain a chart image, and colorimetric values of the chart image are acquired using the scanner 218 or colorimeter 102 of the MFP 101a. In the second method, for the chart image output by the same method as the first method, the controller 201 of the MFP 101b acquires colorimetric values using the scanner 218 or colorimeter 102. Then, the controller 201 of the MFP 101a receives the acquired, colorimetric values using the network I/F 221. In the third method, all the MFPs 101 store, in advance, colorimetric values of chart images, which are output in correspondence with the common color reproduction range data (L*a*b*) 811, in their reference data storage units 408. In step S1008, when the MFP 101a is a correction target device, the controller 201 of the MFP 101a receives the colorimetric values stored in the reference data storage unit 408 of the MFP 101b using the network I/F 221. The present invention is not limited to the aforementioned examples, and may use any other methods as long as they can acquire the reference values (L*a*b*) 1009 of the correction target device corresponding to the common color reproduction range data (L*a*b*) 811.

In this case, since the CMYK space is a device-dependent color space, CMY values of the chart data generated by the MFP 101b by the first method do not always assume the same values as those of the chart data C (CMY) 1003 generated by the MFP 101a. However, since the respective chart, data are generated based, on the common color reproduction range data (L*a*b*) 811, they assume the same values when comparison is executed, as L*a*b* values on a device-independent color space. Therefore, differences between the reference values (L*a*b*) 1009 and colorimetric values (L*a*b*) 1007 on the device-independent color space correspond to color differences between the correction target device and the self device. Hence, the colors of the self device can be set to approach those of the correction target device when correction processing (to be described later) is executed in consideration of the differences.

That is, in step S1010, the controller 201 corrects the L*a*b*→CMY 3D-LUT 610 of the self device using the acquired reference values (L*a*b*) 1009 of the correction target device and the colorimetric values (L*a*b*) 1007 of the self device (3D-LUT correction processing). As a result, an L*a*b*→CMY 3D-LUT (corrected) 1011 is generated. Details of this table correction processing will be described later.

Finally, in step S1012, the controller 201 generates a CMYK→CMYK 4D-LUT 1014 of the self device. In this case, the controller 201 uses the CMY→L*a*b* 3D-LOT 507 of the self device, the L*a*b*→CMY 3D-LUT (corrected) 1011 which considers the reference values (L*a*b*) 1009 of the correction target device, and device information 1013 of the self device. Details of this table generation processing will be described later.

3D-LUT Correction Processing (S1010)

Figure 11:
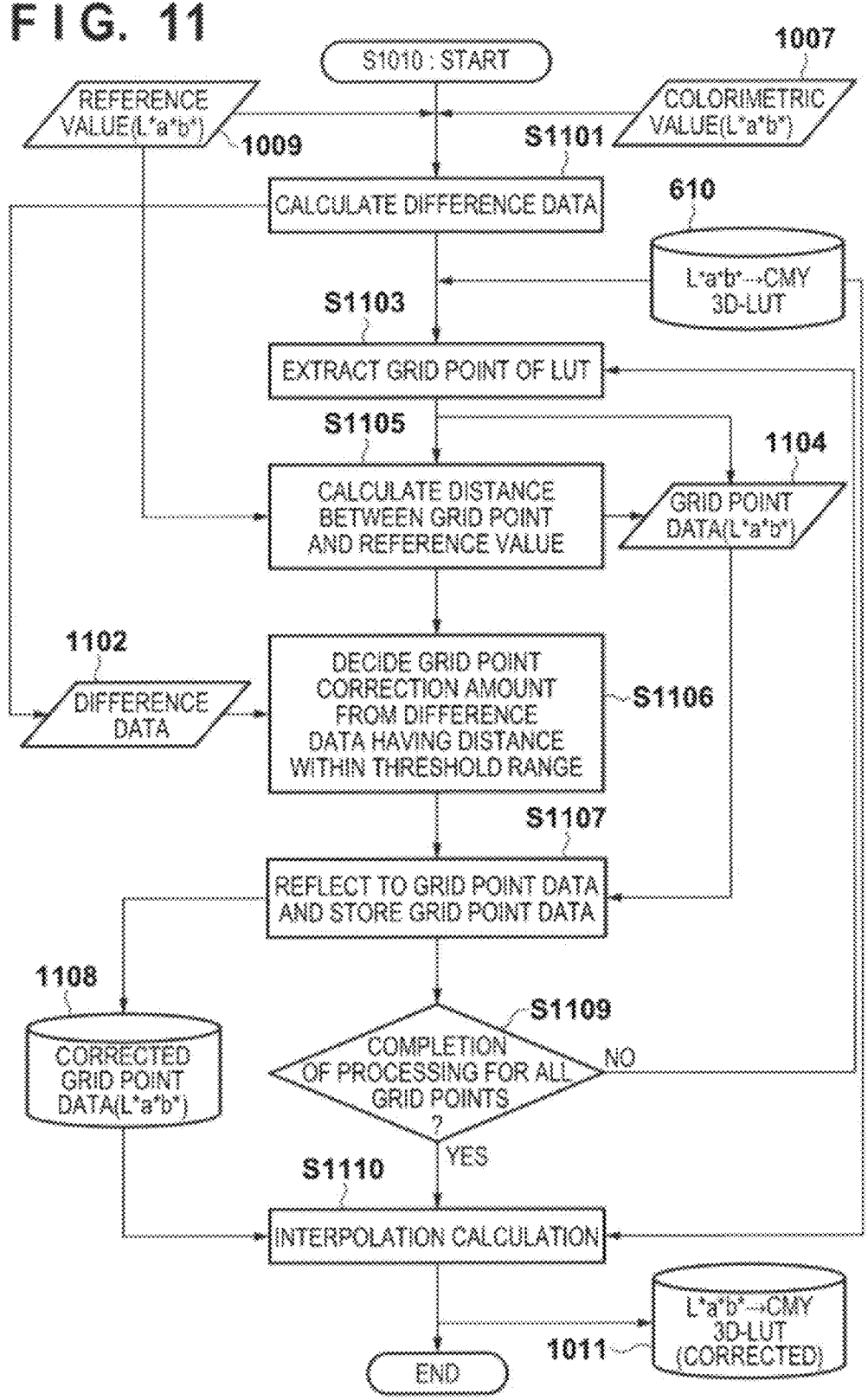
FIG. 11 is a flowchart showing processing for correcting the L*a*b*→CMY 3D-LUT.

Details of the three-dimensional LUT correction processing in step S1010 will be described below with reference to FIG. 11. In step S1101, the controller 501 executes difference calculation processing between the reference values (L*a*b*) 1009 and colorimetric values (L*a*b*) 1007, thus obtaining difference data 1102. In this case, since both the reference values (L*a*b*) 1009 and colorimetric values (L*a*b*) 1007 are obtained by reading the chart image output based on the common color reproduction range data (L*a*b*) 811, they include the same number of data. Therefore, the difference data 1102 are calculated as many as the number of data of the chart, data C (CMY) 1003. These difference data 1102 indicate color differences between the correction target device and self device.

In step S1103, the controller 201 extracts one of grid point data (L*a*b*) of the L*a*b*→CMY 3D-LUT 610 to obtain grid point data (L*a*b*) 1104. Note that in the grid point data (L*a*b*) 1104, L* assumes a value ranging from 0 to 100, and a* and b* respectively assume values ranging from −128 to 128. When the number of grid points is specified by 33×33×33, L* uniformly increases in increments of about 3, and a* and b* uniformly increase in increments of 4. That is, the grid point data (L*a*b*) 1104 is one of 33×33×33=35937 data within a range of (L*a*b*)=(0, −128, −123) to (100, 128, 128).

In step S1105, the controller 201 executes distance calculation processing between the extracted grid point data (L*a*b*) 1104 and the reference values (L*a*b*) 1009 on an Lab color space. Then, in step S1106, the controller 201 extracts difference data, whose difference falls within a predetermined threshold range and corresponds to the reference value (L*a*b*) 1009, and decides that difference data as a correction amount (grid point correction amount) for the grid point data (L*a*b*) 1104. Note that, a plurality of difference data may often be extracted. In such case, the plurality of data include those which have smaller and larger distances to the grid, point data (L*a*b*) 1104. In this embodiment, in order to strengthen the influence of difference data having a small distance and to weaken, the influence of difference data having a large distance, the plurality of difference data are weighted using the calculated distances and added, thereby deciding a grid point correction amount. If there is no difference data within the threshold, range, a correction amount for that grid point data (L*a*b*) 1104 is set to be 0 to skip its correction.

In step S1107, the controller 201 adds the grid point correction amount decided in step S1106 to the grid point data (L*a*b*) 1104, and defines the obtained sum value as corrected grid point data. (L*a*b*) 1108. Then, the controller 201 determines in step S1109 whether or not the processing is complete for all grid point data (L*a*b*) 1104. If grid point data (L*a*b*) to be processed, still remain, the process returns to step S1103 to extract new grid point data (L*a*b*) 1104, thus repeating the above processing. On the other hand, if the processing is complete for all the grid point data (L*a*b*) 11.04, the controller 201 executes interpolation calculation processing of the L*a*b*→CMY 3D-LUT 610 in step S1110. That is, in this case, since the processing is complete for all the grid point data (L*a*b*) 1104, the corrected grid point data (L*a*b*) 1108 are generated, as many as the number of grid points. Therefore, by making interpolation calculations using the original L*a*b*→CMY 3D-LUT 610 for the corrected grid point data (L*a*b*) 1108, new CMY values can be calculated. By setting these CMY values as CMY output values to the original grid, point data (L*a*b*) 1104, the L*a*b*→CMY 3D-LUT (corrected) 1011 is generated.

With the aforementioned processing, respective grid points of the L*a*b*→CMY 3D-LUT 610 in the self device are corrected to approach colorimetric values (grid points) within the common color reproduction range of the correction target device. At this time, since a difference between each grid point and that of the correction target device is calculated, and a correction amount is decided with reference to the difference data falling within a predetermined distance range from that grid point, correction amounts of many grid point data can be decided, using a fewer number of data. Note that the method of correcting the L*a*b* CMY 3D-LUT 610 is not limited, to this specific example.

4D-LUT Generation Processing (S1012)

Figure 12:
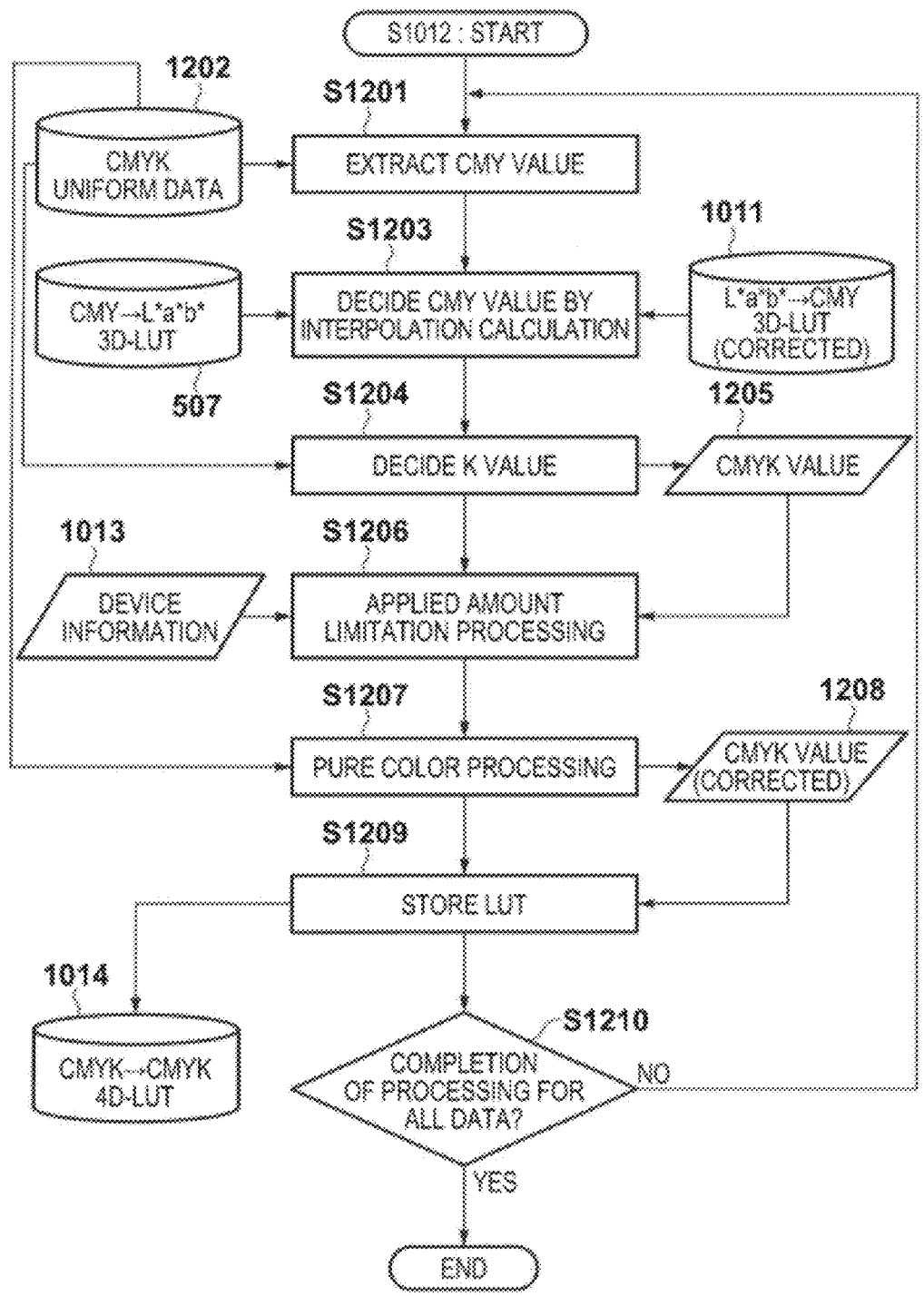
FIG. 12 is a flowchart showing processing for generating a CMYK→CMYK 4D-LUT.

Details of the four-dimensional LUT generation processing in step S1012 will be described below with reference to FIG. 12. In step S1201, the controller 201 extracts one CMY value from CMYK uniform data 1202, which are generated in advance by uniformly dividing CMYK values. The CMYK uniform data 1202 include CMY values as many as the number of grid points of a CMYK→CMYK 4D-LUT 1014 to be generated, and data intervals are the same as those of grid, points. For example, when the number of grid points of the CMYK→CMYK 4D-LUT 1014 is 8×8×8×8=4096, the number of data of the CMYK uniform data 1202 is also 4096. When data are expressed by 8 bits (0 to 255), a data interval is about 36.

In step S1203, the controller 201 applies the CMY→L*a*b* 3D-LUT 507 and L*a*b*→CMY 3D-LUT (corrected) 1011 to the CMY value extracted in step S1201 to determine a corrected CMY value. That is, the controller 201 executes interpolation calculations using the CMY→L*a*b* 3D-LUT 507 for the CMY value extracted, in step S1201 to calculate a corresponding L*a*b* value. Then, the controller 201 executes interpolation calculations using the L*a*b*→CMY 3D-LUT (corrected) 1011 for that L*a*b* value, thus obtaining a corresponding CMY value as a corrected CMY value. Note that the CMY→CMY 3D-LUT obtained in this step may be used in correction in place of the 4D-LUT to be generated in this embodiment.

In step S1204, the controller 201 extracts a K value corresponding to the CMY value extracted in step S1201 from the CMYK uniform data 1202, and generates a CMYK value 1205 by combining the extracted K value with the corrected CMY value decided in step S1203. Then, in step S1206, the controller 201 executes applied amount limitation processing of toners (printing agents) using the device information 1013. In this case, the device information 1013 expresses toner amounts that can be applied to the printer 214 as numerical values, which amounts will be referred to as "applied amounts" hereinafter. For example, in case of CMYK data, if a maximum value of an applied amount of a unicolor is 100%, signal values of 400% can be set in maximum. However, when a total amount of applicable toners is 300%, the maximum applied amount is 300%. The CMYK value 1205 may exceed a prescribed applied amount depending on its combination. Therefore, in such case, the applied amount limitation processing for suppressing the total toner amount to be equal to or lower than an allowance value is executed by executing, for example, UCR processing which replaces CMY toners by a K toner. A general black expression method includes that using equal amounts of CMY, and that using K alone. An expression using K alone has a lower density than an expression using CMY, but there is a merit of reducing an applied, amount.

In step S1207, the controller 201 executes pure color processing to generate a CMYK value (corrected) 1208. In this case, a pure color is expressed as a unicolor of CMYK or RGBW. Upon execution of correction using the CMYK→CMYK 4D-LUT 1014, it is ideal that if, for example, an input value is pure color data of unicolor C, its output value is also unicolor C. Therefore, in this embodiment, if it is determined with reference to the original CMYK uniform data 1202 that data to be processed is originally pure color data, the CMYK value after the applied amount limitation processing in step S1206 is modified to pure color data. For example, when CMYK uniform data 1202 indicates unicolor C but a CMYK value after the applied amount limitation processing includes an M value, a CMYK value (corrected) 1208 is generated by setting this M value to be zero. Then, in step S1209, the controller 201 stores the CMYK value (corrected) 1208 corresponding to the CMYK uniform data 1202 in the CMYK→CMYK 4D-LUT 1014.

Finally, the controller 201 determines in step S1210 whether or not the processing is complete for all data of the CMYK uniform data 1202. If data to be processed still remain, the process returns to step S1201, and the controller 201 extracts a CMY value to be processed, from, the CMYK uniform data 1202, thus repeating the processing. When the processing is complete for all the data of the CMYK uniform data 1202, the CMYK→CMYK 4D-LUT 1014 is completed.

Note that the description of this embodiment has been given taking a practical number as the number of grid points of the LUT. Of course, the number of grid, points is not limited to such example. As the number of grid points, the CMYK→CMYK 4D-LUT 1014 may include different numbers of C and M grid points. Thus, an LUT having a special configuration may be configured.

In the example of this embodiment, the correction target device is selected in step S419. However, the correction target device selection method is not limited to the example of this embodiment. For example, "not set" may be selectable in the device list display on the correction target device selection screen. When no correction target device is set, the L*a*b*→CMY 3D-LUT (corrected) 1011 can be generated using the reference values 1009 as the common color reproduction range data (L*a*b*) 811.

As described above, according to this embodiment, each of a plurality of correction performing devices generates the 4D-LUT required, to match colors of mixed colors within the common color reproduction range with those of the correction target device independently of the number and types of profiles and color conversion methods used in that device. By executing correction using the 4D-LUT generated in this way in each correction performing device, the colors of the mixed colors within the common color reproduction range can be corrected to approach those of the correction target device with high precision. That is, in the first output device as one of the plurality of correction performing devices, colors of an output image within a color reproduction range common to the second output device as a correction target and the third output device as the other correction performing device can be matched with those of the second output device.

Also, according to this embodiment, upon generation of the 4D-LUT of the self device, only color reproduction ranges of other correction performing device including the correction target device need only be obtained. Therefore, as a correction target device or correction performing device other than the self device, a device which does not particularly include any 3D-LUT or 4D-LUT may be selected to attain color matching.

<Second Embodiment>

The second embodiment according to the present invention will be described, hereinafter. The aforementioned first, embodiment has exemplified the case in which a 4D-LUT required, to match colors of mixed colors of a device is calculated using chart data within a common color reproduction range between different devices, so as to approach the colors of the mixed colors within, the common color reproduction range to those of a correction target device. By contrast, the second embodiment corrects the colors of the mixed colors using chart data not only in the common color reproduction range but also a color reproduction range of the correction performing device itself (self device). Thus, not only the colors of the mixed colors in the common color reproduction range are corrected to approach those of the correction target device, but also the stability of the colors of the mixed colors in the overall color reproduction range of the self device can be enhanced.

Hence, the second embodiment allows L*a*b* data 1911, which is determined to fall outside a color reproduction range in any of correction performing devices, to be stored as common color reproduction, range data (L*a*b*) 1912 if that data falls within the color reproduction range of the self device. Then, intra-color reproduction range information 1909 to be stored, in a reference data storage unit is appended, with information indicating whether or not data falls within the common color reproduction range and whether or not that data falls within the color reproduction range of the self device even if it falls outside the common color reproduction range. Then, data, of the color reproduction range indicated by the intra-color reproduction range information 1909 is combined with reference values A (L*a*b*) 2111 of a correction target device, in the second, embodiment, combined reference values generated by this combining processing are defined as new reference values B (L*a*b*) 2113, and a 4D-LUT is calculated based on the reference values B (L*a*b*) 2113.

Since the system configuration and basic operation in the second, embodiment are the same as those which execute the image correction processing using the 4D-LUT in the aforementioned first embodiment, a description thereof will not be repeated. Generation processing of the 4D-LUT according to the second embodiment will be described below especially for differences from the first, embodiment.

Color Reproduction Range Calculation Processing

Figure 19:
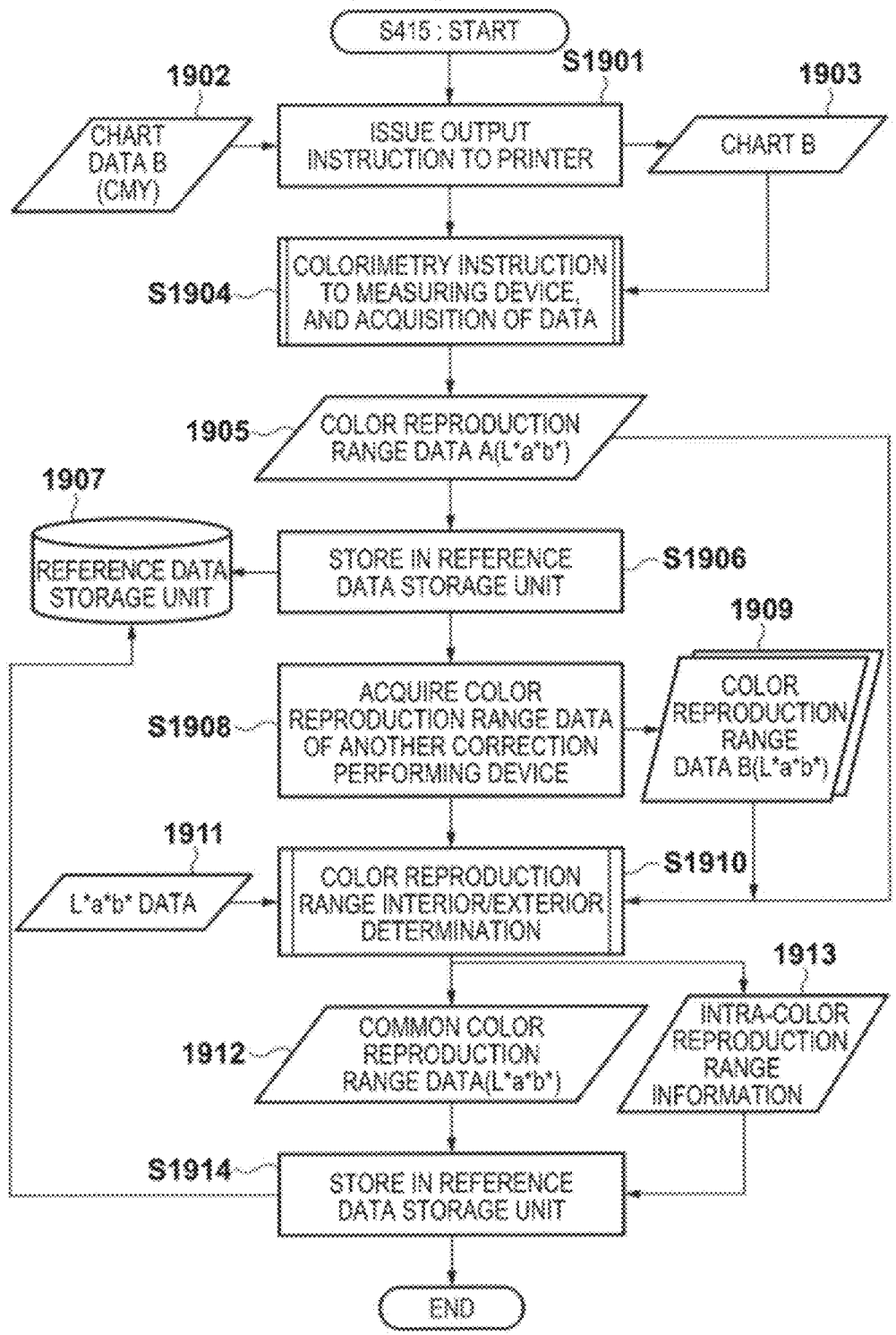
FIG. 19 is a flowchart showing processing for generating color reproduction range data of a self device, common color reproduction range data, and infra-common color reproduction range flags according to the second embodiment.

FIG. 19 shows the sequence of processing for generating color reproduction range data A (L*a*b*) 1905, common color reproduction range data (L*a*b*) 1912, and infra-common color reproduction range flags 1913, which are to be stored in a reference data storage unit 1907 in the second embodiment. Since processes in steps S1901 to S1908 are the same as those in steps S801 to S807 in FIG. 8, a description thereof will not be repeated.

In step S1910, the controller 201 of the self device executes color reproduction range interior/exterior determination processing using color reproduction range data A (L*a*b*) 1905 of the self device, color reproduction, range data B (L*a*b*) 1909 of other correction performing devices, and predetermined L*a*b* data 1911. With this color reproduction range interior/exterior determination processing, the controller 201 generates common color reproduction range data (L*a*b*) 1912 indicating a color reproduction range common to all the correction performing devices and intra-color reproduction range flags 1913 indicating that data fall outside the common color reproduction range but fall within the color reproduction range of the self device. Details of the generation processing of the intra-common color reproduction range flags 1913 will be described later. Note that the L*a*b* data 1911 define an arbitrary number of data from huge combinations of L*a*b* values, and are, for example, uniform data divided at given intervals.

In step S1914, the controller 201 stores the acquired common color reproduction range data (L*a*b*) 1912 and intra-common color reproduction range flags 1913 in the reference data storage unit 1907. These data and flags are stored in association with a color reproduction range name input, by the user and the selected correction performing devices.

Although a detailed generation method will be described, later, the common color reproduction range data (L*a*b*) 1912 in the second, embodiment are those which express the whole color reproduction range of the self device. Each intra-common color reproduction range flag 1913 indicates the following two pieces of information for each value of the common color reproduction range data (L*a*b*) 1912. That is, if the flag=ON, it indicates that common color reproduction range data (L*a*b*) 1912 of interest falls within the color reproduction range common to all the correction performing devices. If the flag=OFF, it indicates that common color reproduction range data (L*a*b*) 1912 of interest falls outside the common color reproduction range but falls within the color reproduction range of the self device.

Color Reproduction Range Interior/Exterior Determination Processing (S1910)

Figure 20:
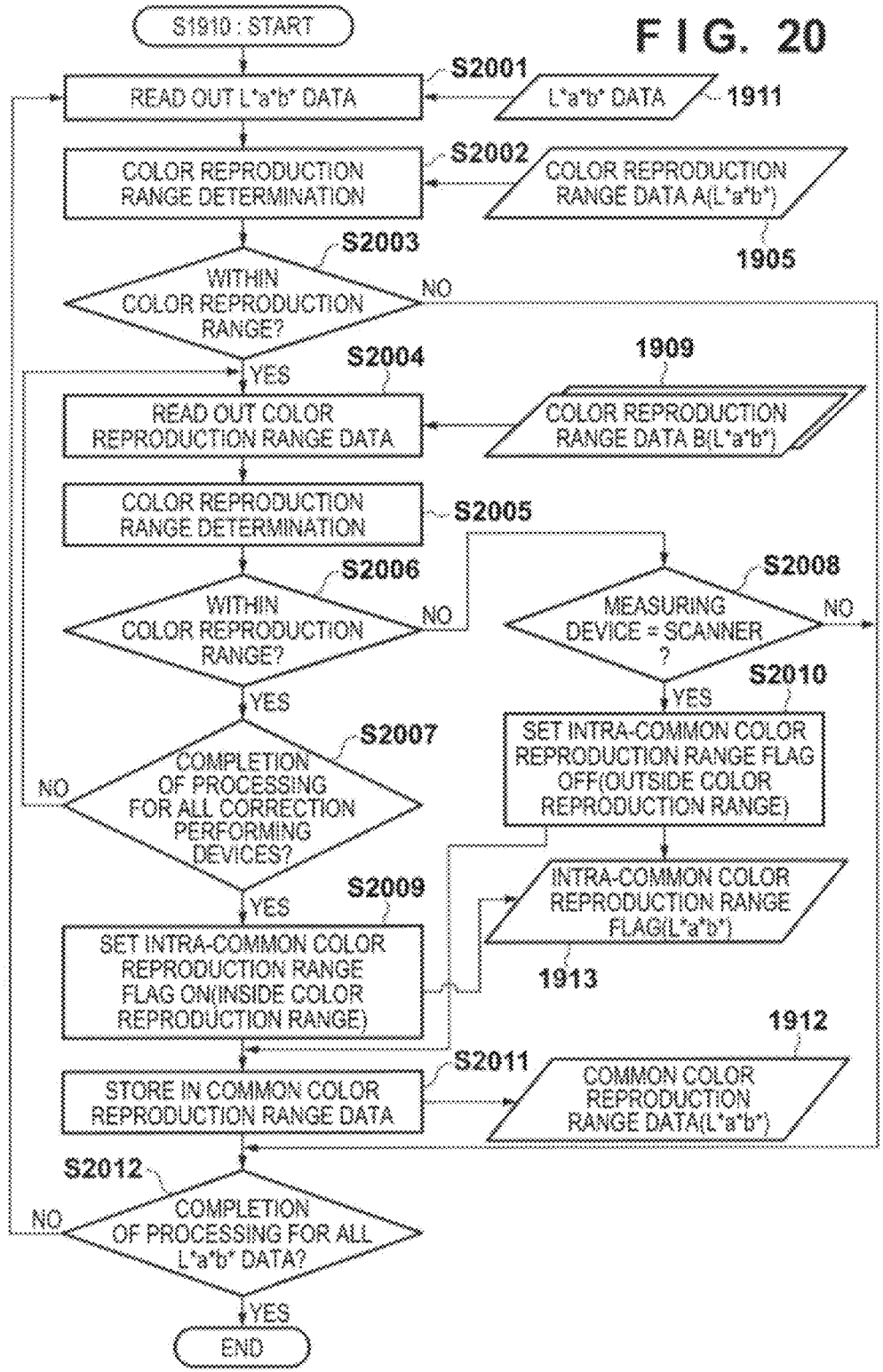
FIG. 20 is a flowchart showing color reproduction range interior/exterior determination processing according to the second embodiment.

Details of the color reproduction range interior/exterior determination processing in step S1910 above will be described below with reference to FIG. 20. Since processes in steps S2001 to S2005 are the same as those in steps S901 to S905 in FIG. 9, a description thereof will not be repeated.

In step S2005, the controller 201 executes determination processing as to whether or not the L*a*b* data 1911 read, our in step S2001 falls within a color reproduction, range indicated by the color reproduction range data B (L*a*b*) 1909 of the other device read out in step S2004. If the determination result indicates that the data falls within the color reproduction range in step S2006, the controller 201 determined in step S2007 whether or not the processing is complete for all the correction performing devices. If it is determined that the processing is complete for all the correction performing devices, the controller 201 stores information (flag=ON) indicating that the L*a*b* data 1911 falls "within" the common color reproduction range as an intra-common color reproduction range flag 1913 in step S2009. In step S2011, the controller 201 stores that L*a*b* data 1911 as common color reproduction range data (L*a*b*) 1912, and the process then advances to step S2012. On the other hand, if it is determined in step S2007 that the processing is not complete for all the correction performing devices yet, the process returns to step S2004 to read out color reproduction range data B (L*a*b*) 1909 of the remaining correction performing device, thus repeating the processing.

On the other hand, if it is determined in step S2006 that the data falls outside the color reproduction range, the process advances to step S2008 to determine a measuring device used. This determination is based on the measuring device selected in step S404 in the color reproduction range calculation processing. If the measuring device is the scanner, the controller 201 stores information (flag=OFF) indicating that the L*a*b* data 1911 falls "outside" the common color reproduction range as an infra-common color reproduction range flag 1913 in step S2010. In step S2011, the controller 201 stores the L*a*b* data 1911 as common color reproduction range data (L*a*b*) 1912. On the other hand, if the measuring device is the colorimeter 102, the controller 201 does not store the L*a*b* data 1911 as the common color reproduction range data (L*a*b*) 1912, and does not generate any infra-common color reproduction range flag 1913, and the process advances to step S2012. The common color reproduction range data (L*a*b*) 1912 is set depending on the measuring device used, for the following reason. That is, a chart C is output according to the common color reproduction range data (L*a*b*) 1912 generated in this processing, and undergoes colorimetry processing in subsequent color correction parameter generation processing. A time required for colorimetry is largely different, depending on whether or not a measuring device used, in that colorimetry can simultaneously measure colors of a plurality of patches. Hence, in this embodiment, when the measuring device is the scanner which executes two-dimensional scanning, it is judged that scanning is completed within a short period of time even when the number of patches on the chart C is increased. Therefore, in this case, the L*a*b* data 1911, which is determined in step S2006 to fall outside the color reproduction range of the other device although it falls within the color reproduction range of the self device, is included in the common color reproduction range data (L*a*b*) 1912 in steps S2010 and S2011. On the other hand, when the measuring device is the colorimeter which scans patch by patch, if the number of patches on the chart C is increased, a long processing time is required. Therefore, in this case, the L*a*b* data 1911, which is determined in step S2006 to fall outside the color reproduction range of the other device although it falls within the color reproduction range of the self device, is not included in the common color reproduction range data (L*a*b*) 1912.

Note that the measuring device determination processing in step S2008 may be omitted. In this case, for the L*a*b* data 1911, which is determined in step S2006 to fall outside the color reproduction range of the other device, an infra-common color reproduction range flag 1913 is unconditionally set to be OFF in step S2010, and that data is stored in the common color reproduction range data (L*a*b*) 1912 in step S2011.

Upon completion of the processing for the L*a*b* data 1911 as described above, the controller 201 determines in step S2012 whether or not the processing is complete for all L*a*b* data 1911. If the processing is not complete for all the data yet, the process returns to step S2001, and L*a*b* data 1911 to be processed is read out to repeat processing. However, if it is determined that the processing is complete for all the L*a*b* data 1911, the color reproduction range interior/exterior determination processing ends.

With this processing, the common color reproduction range data (L*a*b*) 1912 including the L*a*b* data 1911 which fall outside the color-reproduction ranges of other devices but fall within the color reproduction range of the self device are completed. Then, for each data of the common color reproduction range data (L*a*b*) 1912, which data falls within the color reproduction ranges of all the correction performing devices, an intra-common color reproduction range flag 1913 is ON.

Color Correction Parameter Generation Processing (S422)

Figure 21:
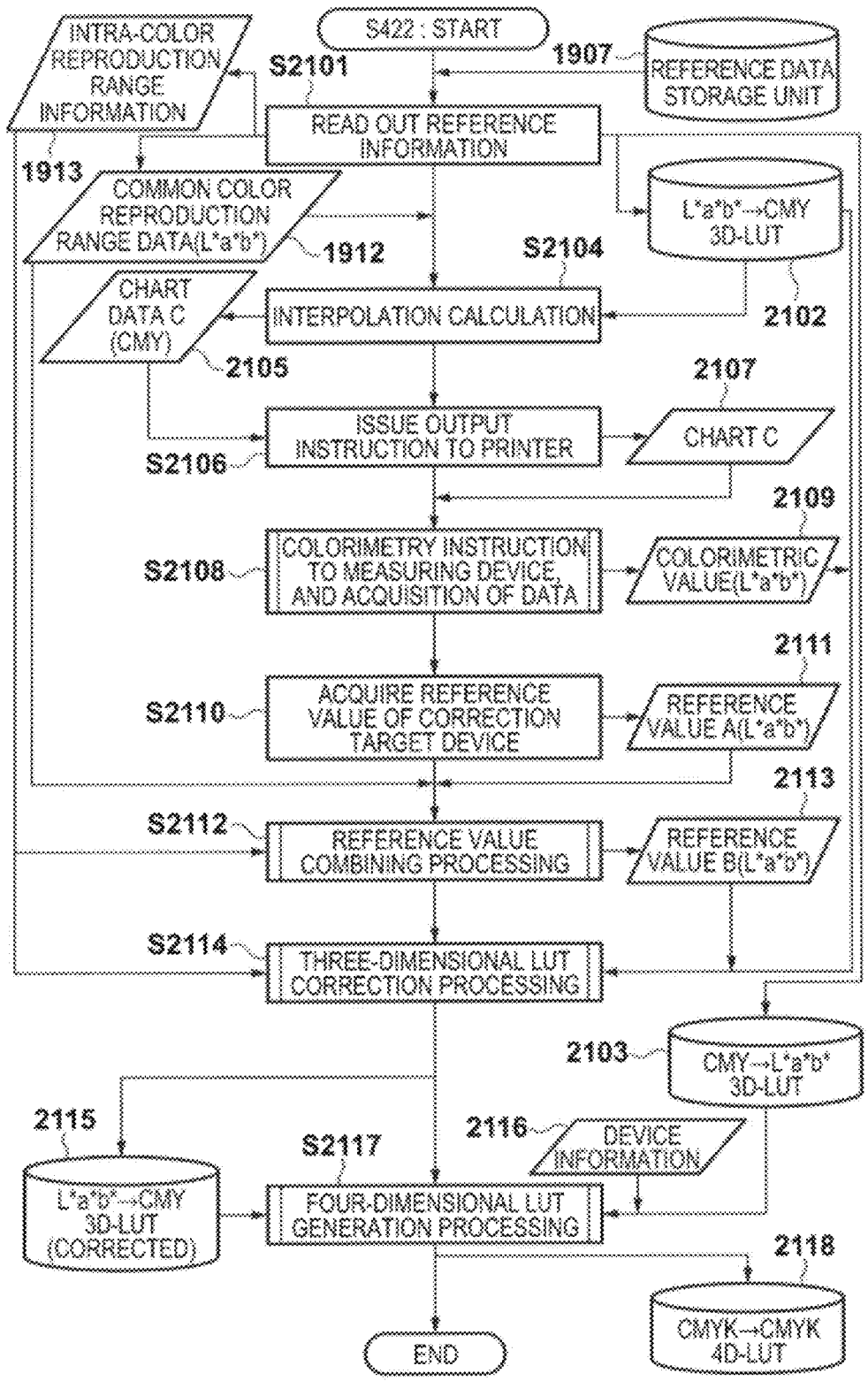
FIG. 21 is a flowchart showing processing for generating color correction parameters according to the second embodiment.
Figure 22:
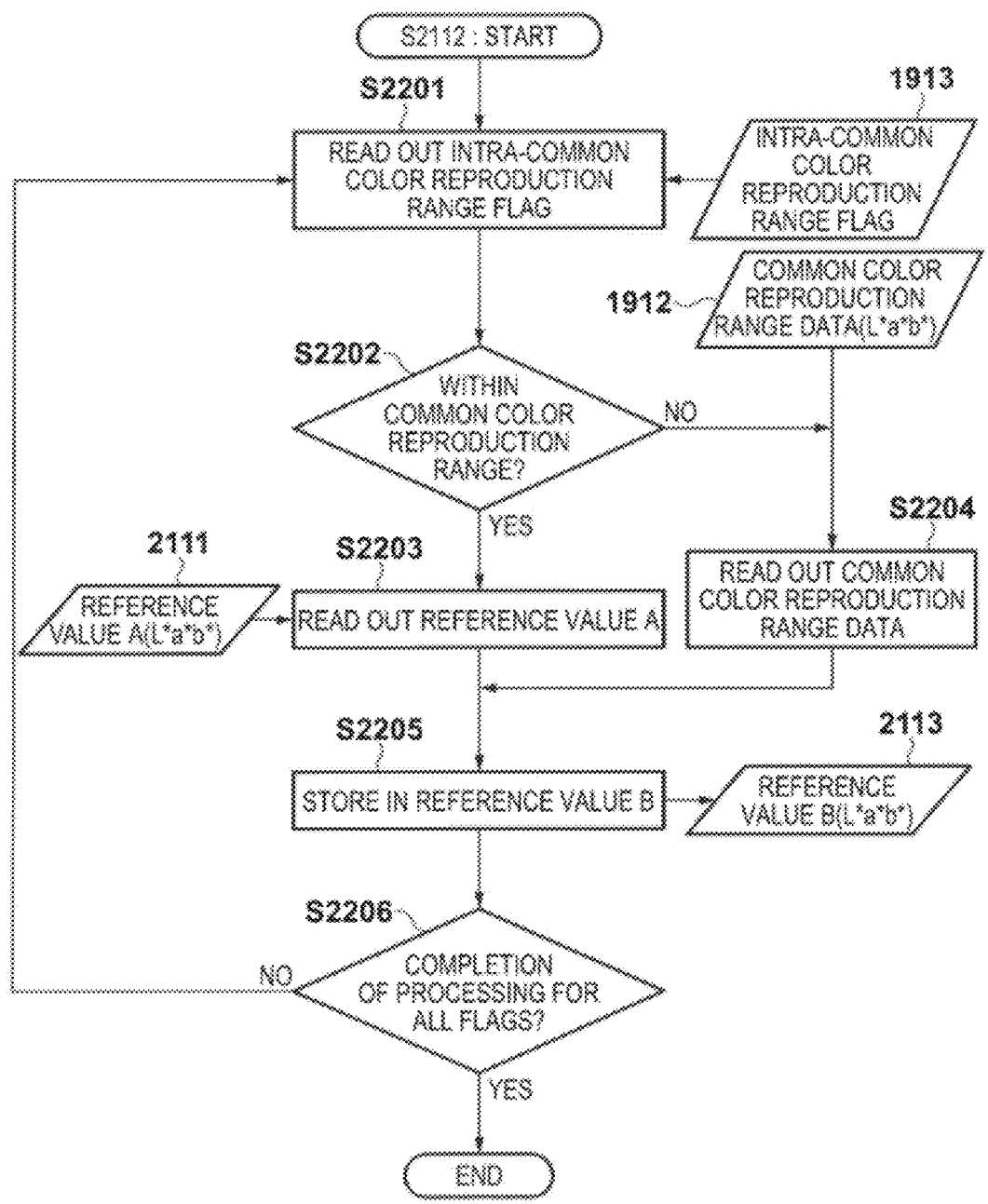
FIG. 22 is a flowchart showing reference value combining processing according to the second embodiment.
Figure 23:
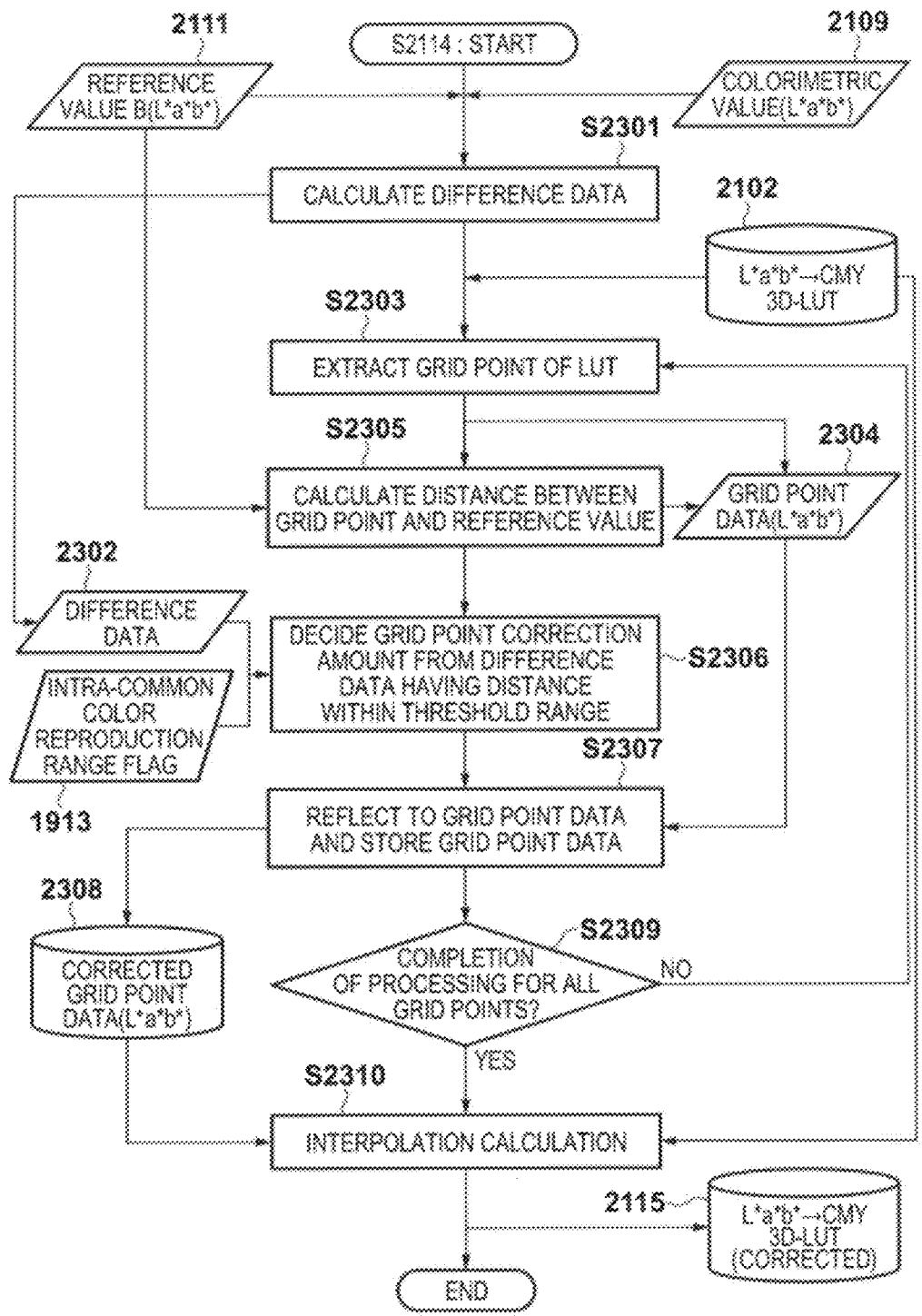
FIG. 23 is a flowchart showing processing for correcting an L*a*b*→CMY 3D-LUT according to the second embodiment.

The color correction parameter generation processing in the second embodiment will be described in detail below with reference to FIGS. 21 to 23. FIG. 21 shows the sequence of processing for generating color correction parameters. In step S2101, the controller 201 acquires an L*a*b*→CMY 3D-LUT 2102 and CMY→L*a*b* LUT 2103 as correction target reference information selected from the reference information selection screen in step S417 above from the reference data storage unit 1907. In step S2101, the controller 201 further reads out the common color reproduction range data (L*a*b*) 1912 as a correction target color reproduction range, which is selected, from she color reproduction range selection screen in step S418 above, and corresponding intra-common color-reproduction range flags 1913. Since subsequent processes in steps S2104 to S2108 are the same as those in steps S1002 to S1006 in FIG. 10, a description thereof will not be repeated. However, in the second embodiment, upon generation of chart data C (CMY) 2105 in step S2104, the common color reproduction range data (L*a*b*) 1912 include a full color reproduction range of the self device. Therefore, the chart data C (CMY) 2105 include CMY values optimal to the self device as well as those which fall outside the color reproduction range common to all the correction performing devices.

In step S2110, the controller 201 acquires reference values A ((L*a*b*) 2111 of the correction target device selected in step S419. Since the acquisition method of the reference values A (L*a*b*) 2111 is the same as that in the example in step S1008, a description thereof will not be repeated. Then, in the second embodiment, in step S2112, the controller 201 executes reference value combining processing using the reference values A (L*a*b*) 2111, infra-common color reproduction range flags 1913, and common color reproduction range data (L*a*b*) 1912, thereby calculating reference values B (L*a*b*) 2113. Details of the calculation processing of the reference values B (L*a*b*) will be described later.

In step S2114, the controller 201 corrects the L*a*b*→CMY 3D-LUT 2102 of the self device using the combined reference values B (L*a*b*) 2113 of the correction target device, and colorimetric values (L*a*b*) 2109 and the intra-common color reproduction range flags 1913 of the self device. As a result, an L*a*b*→CMY 3D-LUT (corrected) 2115 is generated. Details of this 3D-LUT correction processing will be described later.

In step S2117, the controller 201 generates a CMYK→CMYK 4D-LUT 2118 or the self device using the CMY→L*a*b* 3D-LUT 2103, L*a*b* CMY 3D-LUT (corrected) 2115, and device information 2116 of the self device. This 4D-LUT generation processing is the same as that in FIG. 12 above, and a description thereof will not be given.

Reference Value Combining Processing (S2112)

Details of the reference value combining processing in step S2112 will be described below with reference to FIG. 52. In step S2201, the controller 201 of the self device reads out the intra-common color reproduction range flag 1913. The controller 201 determines in step S2202 whether or not the read-out intra-common color reproduction range flag 1913 is ON, that is, it indicates that corresponding data falls within the common color reproduction range. If the flag indicates that the corresponding data falls within the common color reproduction range, the controller 201 reads out an L*a*b* value of the reference values A (L*a*b*) 2111 of the correction target device corresponding to the common color reproduction range in step S2203.

On the other hand, if the intra-common color reproduction range flag 1913 is OFF, that is, it indicates that corresponding data falls outside the common color reproduction range, the controller 201 reads out an L*a*b* value of the common color reproduction range data (L*a*b*) 1912, which falls outside the common color reproduction range, in step S2204. Then, in step S2205, the controller 201 stores the L*a*b* value read out in step S2203 or S2204 as a reference value B (L*a*b*) 2113.

The controller 201 judges in step S2206 whether or not the processing is complete for all the intra-common color reproduction range flags 1913. If the processing is complete for all the flags, the reference value combining processing ends. If the processing is not complete for all the intra-common color reproduction range flags 1913 yet, the process returns to step S2201 to read out the intra-common color reproduction range flag 1913 to be processed, thus repeating the processing.

The reference values B (L*a*b*) 2113 generated in this way become color reproduction data obtained from the correction target device, since L*a*b* values of the reference values A (L*a*b*) 2111 are read out in correspondence with data falling within the common color reproduction range. On the other hand, the reference values B (*L*a*b*) 2113 become color reproduction data of the self device since the common color reproduction range data (L*a*b*) 1912 are read out in correspondence with data falling outside the common color reproduction range. Therefore, by executing the 3D-LUT correction processing of the self device using the reference values B (L*a*b*) 2113, colors of mixed colors of data which fall within the common color reproduction range can be corrected to approach those of the correction target device, and the colors of the mixed colors of data which fall outside the color reproduction range can be corrected to approach those of the self device.

3D-LUT Correction Processing (S2114)

Details of the correction processing of the L*a*b*→CMY 3D-LUT 2102 in step S2114 will be described, below with reference to FIG. 23. Since processes in seeps 32301 to S2305 and steps S2307 to S2310 are the same as those in steps S1101 to S1105 and steps S1107 to S1110 in FIG. 11, a description thereof will not be repeated. That is, the 3D-LUT correction processing of the second embodiment is different from that of the first embodiment in that the intra-common color reproduction range flag 1913 is referred to in grid point correction amount decision processing in step S2306.

In step S2306, the controller 201 extracts difference data having a distance between a grid point of the L*a*b→CMY 3D-LUT 2102 and the reference value B (L*a*b*) 2113, which falls within a predetermined threshold range. Then, the controller 201 decides a correction amount for grid point data (L*a*b*) 2304 based on that difference data and an intra-common color reproduction range flag 1913 corresponding to the difference data. If a plurality of difference data are extracted, in order to strengthen the influences of difference data having smaller distances to the grid point data (L*a*b*) 2304 and to weaken those of difference data having larger distances, the difference data are weighted based, on their distances. Furthermore, in order to strengthen the influences of difference data, falling within the common color reproduction range and to weaken those of difference data falling outside the common color reproduction range, the plurality of difference data are weighted using weighting coefficients and added, thereby determining a grid point correction amount. For example, a Euclidean distance on a three-dimensional space is used as the distance, and a weight is calculated using;

$$W = 1/(\text{gamut} \times \text{dist}^5 + 1)$$

where W is a weight, gamut is a coefficient for the intra-common color reproduction range flag 1913, and dist is a value obtained by normalizing a distance between the reference value and difference data by a distance for three grid points. The coefficient gamut corresponding to the intra-common color reproduction range flag 1913 is set to be 1 when corresponding data falls within the common color reproduction range, and is set to be 2 when corresponding data falls outside the common color reproduction range, thereby strengthening the influences of difference data falling within the common color reproduction range.

When difference data falling within the threshold range is not detected, a correction amount for that grid point, data (L*a*b*) 2304 is set to be zero, thus skipping the correction.

The second embodiment has exemplified the case in which whether or not the measuring device to be used is the scanner is determined in step S2008, and the intra-common color reproduction range flag 1913 is set according to the determination result. However, as this flag setting method, another method is applicable. For example, a method of setting a flag by determining whether or not a patch colorimetry unit of the measuring device is a device which can scan two-dimensionally, or whether or not a measuring position of the measuring device is fixed and a plurality of patches cannot be scanned at the same time may be used. That is, a flag can be set depending on whether or not the chart C can be scanned within a short period of time in the color correction parameter generation processing. Also, the device main body may be set with the determination result in advance to skip the determination processing in step S2008 and to execute the processing in step S2009.

Two examples of the common color reproduction range data (L*a*b*) 1912, which fall outside the common color reproduction range, but are stored as the reference values B (L*a*b*) 2113, in the reference value combining processing in step S2112 will be explained. As the first example, L*a*b* values obtained by executing colorimetry processing of a CMY chart image generated using the common color reproduction range data (L*a*b*) 1912, which are obtained by previously executing the color reproduction range determination using only the color reproduction range data A (L*a*b*) 1905 of the self device, may be used. As the second example, L*a*b* values obtained by executing interpolation calculations using the L*a*b*→CMY 3D-LUT 2102 and those using the CMY→L*a*b* 3D-LUT 2103 for the common color reproduction range data (L*a*b*) 1912 may be used. The present invention is not limited to these examples, and may use various other methods as long as the reference values (L*a*b*) 2113 of the correction target device corresponding to the common color reproduction range data (L*a*b*) 1912 can be acquired.

As described above, according to the second embodiment, the colors of the mixed, colors are corrected not only for the color reproduction range common to the plurality of correction, performing devices but also for the whole color reproduction range of the self device. As a result, the color correction parameters can be generated to enhance not only the stability of the colors of the mixed colors in the common color reproduction range but also to that of the colors of the mixed colors in the whole color reproduction range of the self device.

<Third Embodiment>

Figure 28:
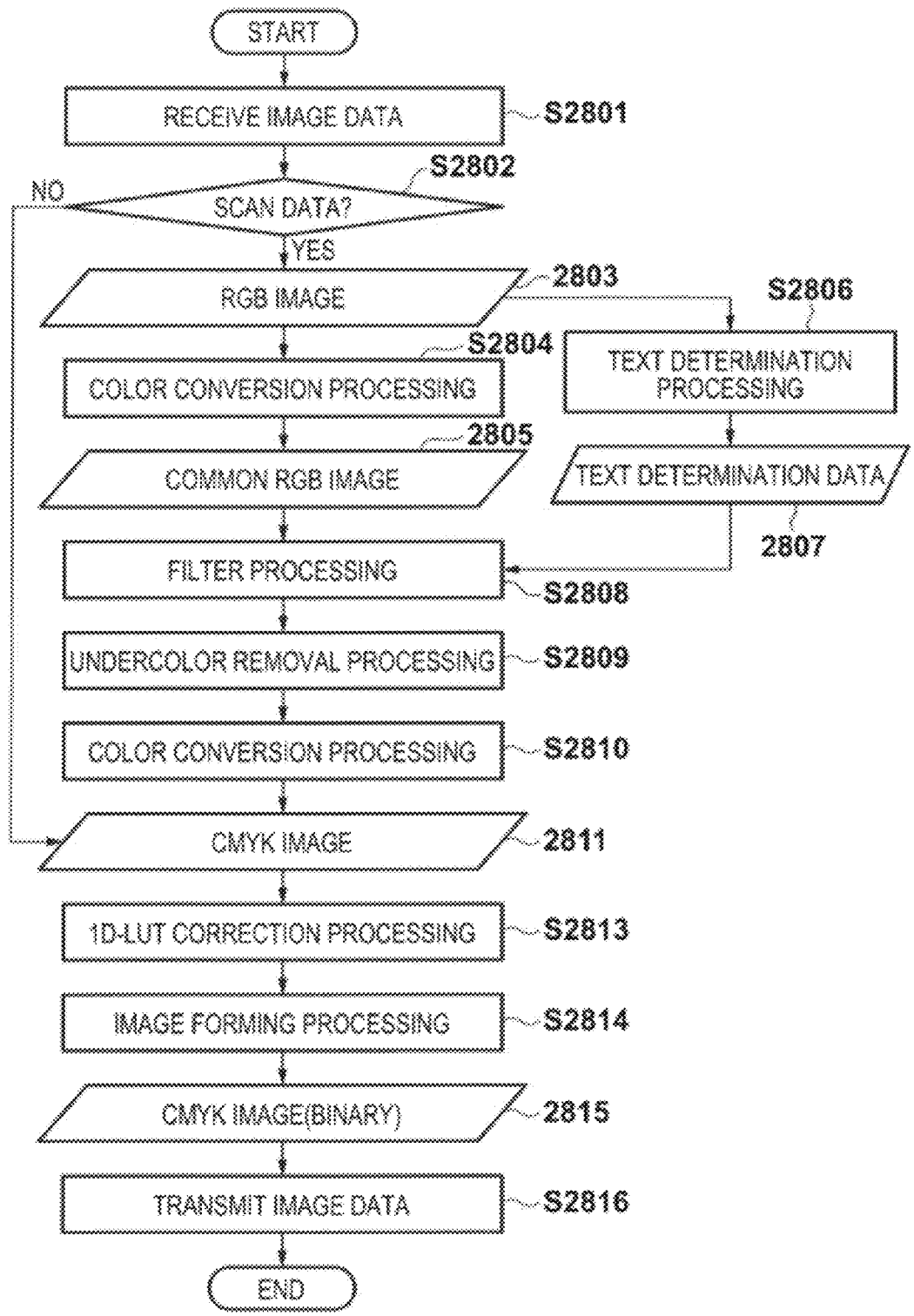
FIG. 28 is a flowchart, showing an overview of image processing according to the third embodiment.

The third embodiment according to the present invention will be described hereinafter. The aforementioned first embodiment has exemplified the case in which the image processing unit 213 executes the 4D-LUT correction processing (S312), as shown in FIG. 3, to achieve color correction of mixed colors in a common color reproduction range. By contrast, the third embodiment will exemplify a case in which the image processing unit 213 corrects existing color conversion profile information such as ICC profiles instead, of 4D-LUT correction processing, as shown in FIG. 28, thereby matching colors of mixed colors between a plurality of devices.

In the third embodiment, since the image processing unit 213 does not execute any 4D-LUT correction processing, a 4D-LUT for correction is generated by the method described in the aforementioned first and second embodiments, and is then saved in the storage device 220 or a memory (not shown) in the controller 201. Then, by applying correction processing using the saved 4D-LUT for CMYK values output from the destination profile 207, device link profile 209, and the like, corrected profiles can be generated.

FIG. 24 shows the sequence of UIs required
to prompt the user to input instructions so as to generate a 4D-LUT and corrected profiles in the third embodiment. Processes in steps S2401 to S2422 except, for steps S2417 and S2422 are the same as the corresponding processes in steps S401 to S421 in FIG. 4, and profile correction processing in step S2423 is newly added. Processes especially different from the first and second embodiments in the third embodiment will be described below.

Figure 26:
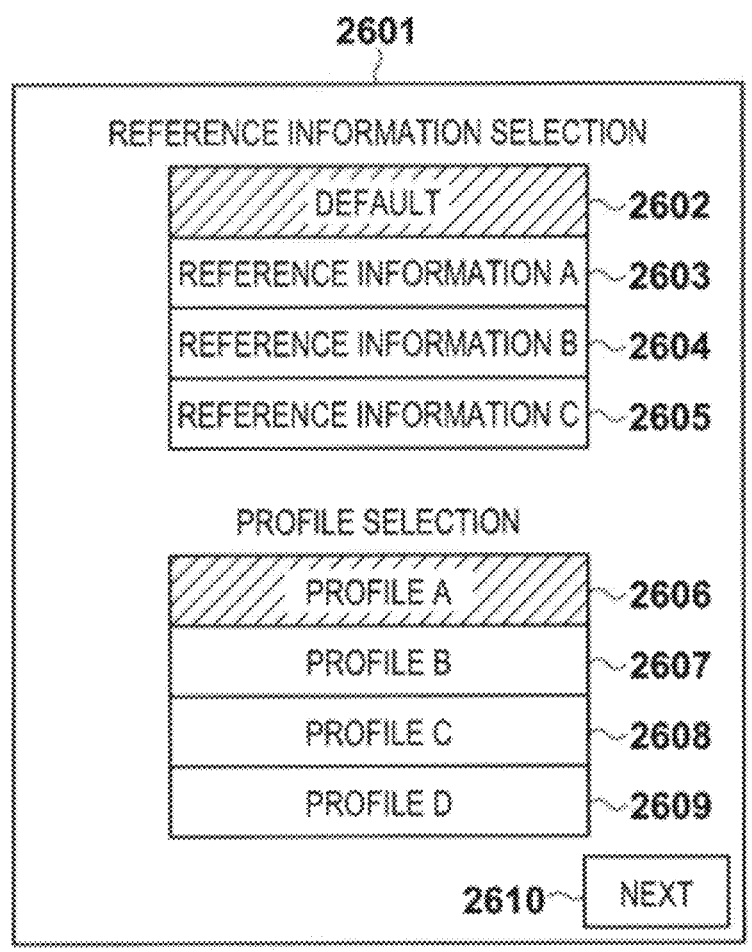
FIG. 26 shows a UI screen example used to select reference information and a profile according to the third embodiment.

When the user selects the "color correction parameter generation" button 1304 in step S2401, the display device 118 displays a reference information selection/profile selection screen in step S2417. FIG. 26 shows an example of a UI screen for reference information selection and profile selection. The display device 118 displays reference information candidates and profile candidates as correction targets in the form of a list on a UI 2601. Since pieces of reference information 2602 to 2605 on the reference information selection screen are the same as the pieces of reference information 1502 to 1505 in FIG. 15, a description thereof will not be repeated. In the third embodiment, a profile as a correction target is selected in addition to the reference information. For example, as a list display different from the reference information, a profile A 2606, profile B 2607, profile C 2608, and profile D 2609 are displayed. These correction target profiles are associated with those such as the destination profile 207, which are used in the image processing unit 218, and a correction target is selected according to a user instruction. When she user presses a "next" button 2610 after selection of the reference information, and profile on the DI screen shown in FIG. 26, the reference information and correction target profile are selected, and a next screen is displayed.

In step S2422, the controller 201 executes color correction parameter generation processing. In the third embodiment, as will be described in detail later, a 4D-LUT is generated as in the first embodiment, and is held on a memory without being stored. In step S2423, the controller 201 loads a profile 2424 selected as a correction target in step S2417, and corrects it based on the 4D-LUT.

Color Correction Parameter Generation Processing/Profile Correction Processing (S2422, S2423)

Figure 25:
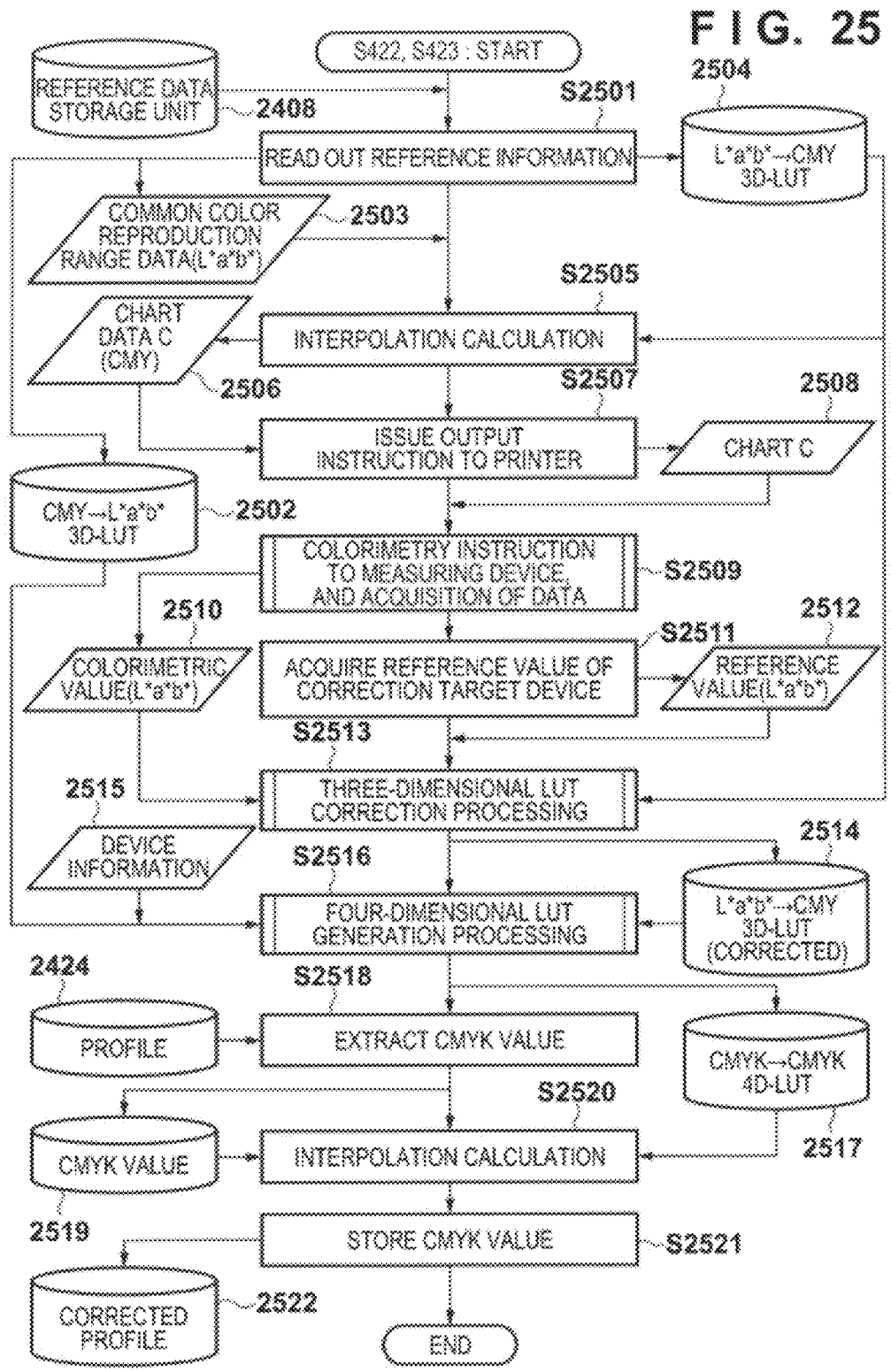
FIG. 25 is a flowchart showing processing for generating color correction parameters according to the third embodiment.

Details of the color correction parameter generation processing in step S2422 and the profile correction processing in step S2423 will be described below with reference to FIG. 25. Since steps S2501 to S2516 in FIG. 25 correspond to the color correction parameter generation processing in step S2422, and are the same as those in steps S1001 to S1012 in FIG. 10, a description thereof will not be repeated. Steps S2518 to S2521 correspond to the profile correction processing in step S2423.

After a CMYK→CMYK 4D-LUT 2517 used to correct mixed colors is generated in step S2516, the controller 201 extracts CMYK values 2519 as output values of grid points of the profile 2424 in step S2518. For example, when the destination profile 207 required to convert L*a*b* values into CMYK values is to be corrected, all CMYK values corresponding to the number of grid points of L*a*b* are extracted. When the number of grid points is 33×33×33, the number of the CMYK values 2519 is 33×33×33=35937. Next, in step S2520, the controller 201 generates corrected CMYK values by interpolation calculations using the CMYK→CMYK 4D-LUT 2517. Finally, in step S2521, the controller 201 stores the corrected CMYK values as those corresponding to the grid points of the profile 2424 before correction, thus generating a corrected profile 2522.

The profile 2424 as the correction target in the third embodiment is not particularly limited, as long as it includes data for outputting values of a device-dependent color space. For example, the profile 2424 may include the destination profile 207 and device link profile 209.

Figure 3:
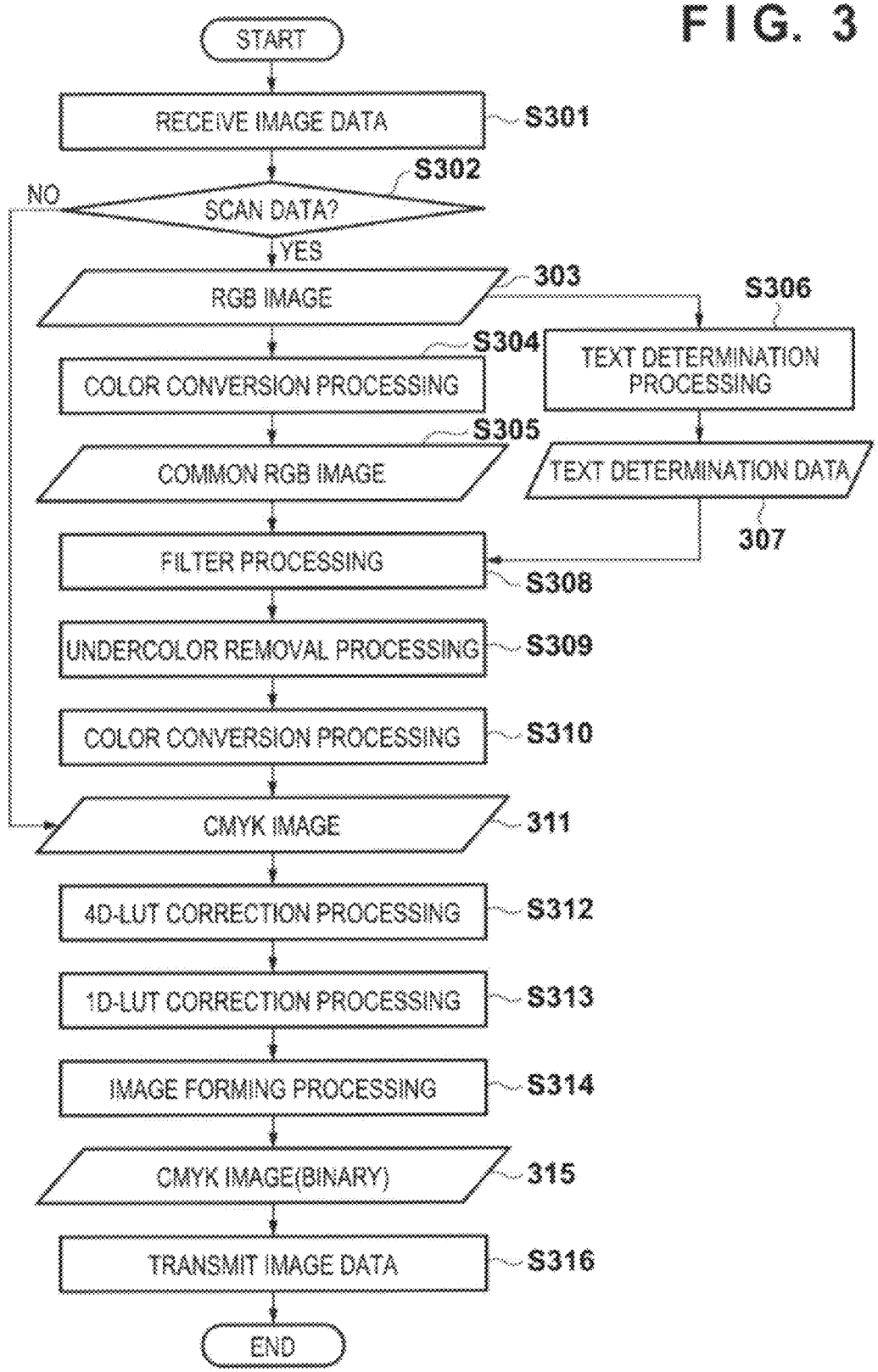
FIG. 3 is a flowchart showing an overview of image processing.
Figure 4:
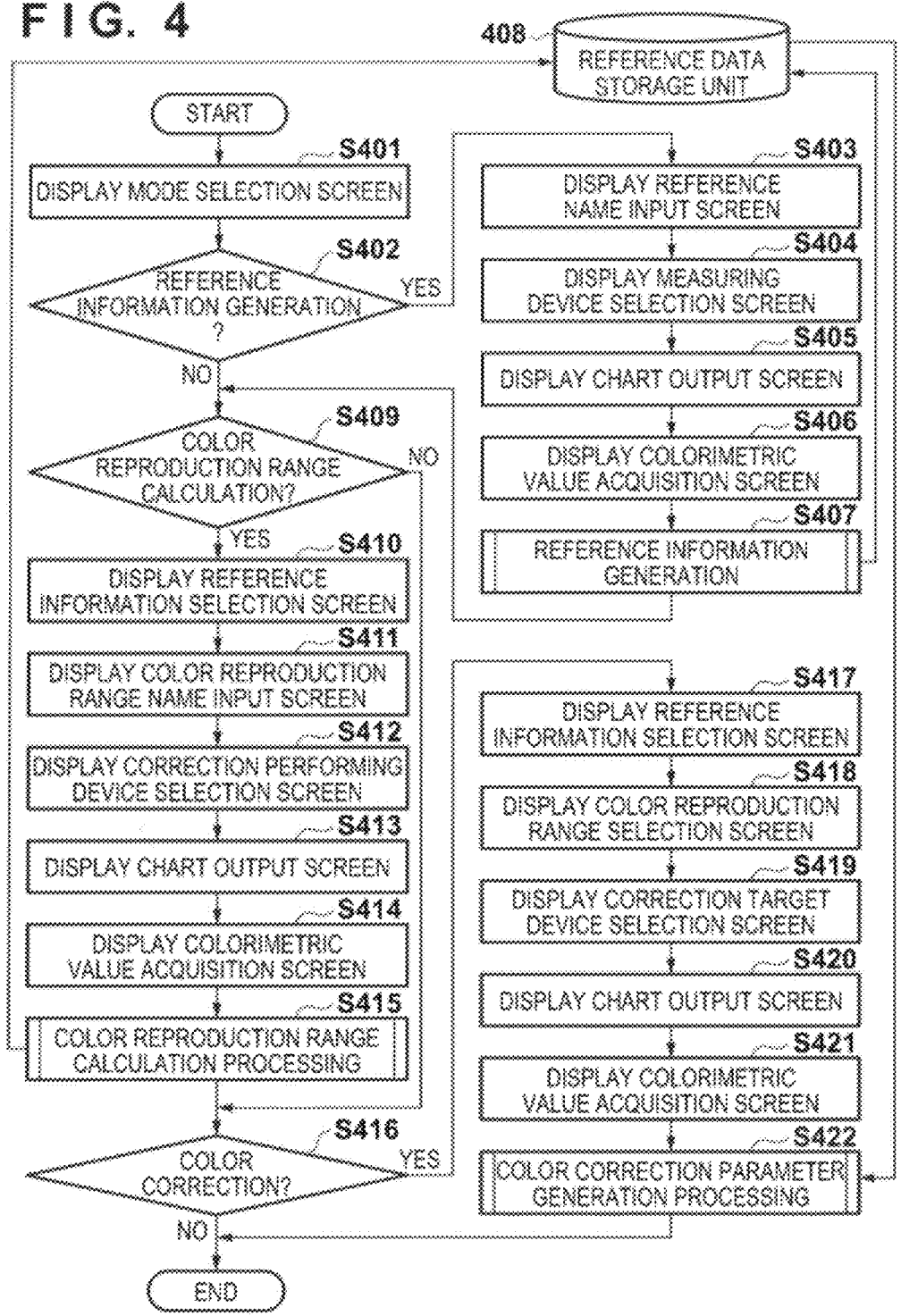
FIG. 4 is a flowchart showing a UI transition example.

Note that in the aforementioned, first embodiment, the method using a 3D-LUT upon conversion of the common RGB image 305 into the CMYK image 311 in step S310 in FIG. 3 is used. Upon calculation of CMYK values of that 3D-LUT, the method of the third embodiment may be applied. Also, in the second embodiment, after the L*a*b*→CMY 3D-LUT (corrected) 2115 is generated in step S2114 in FIG. 21, output data of CMYK values of the profile may be corrected, by the method of the third embodiment.

As described above, according to the third embodiment, CMYK output data in a color conversion profile, which is included in advance in a device, are directly corrected. Thus, the colors of the mixed colors can be matched between a plurality of devices as in the first and second embodiments without holding any 4D-LUT in the device.

<Fourth Embodiment>

The fourth embodiment according to the present invention will be described hereinafter. The aforementioned first embodiment has exemplified the case in which each individual MFP 101 generates its 4D-LUT. The fourth embodiment will exemplify a case in which the server 103 executes 4D-LUT generation, processing for the respective MFPs 101 to match colors of mixed colors between a plurality of devices. Since the system configuration in the fourth embodiment is the same as that shown in FIGS. 1 and 2 in the aforementioned first embodiment, a description thereof will not be repeated. Processing for generating a 4D-LUT in the fourth embodiment will be described below.

In the fourth, embodiment, a controller 225 of the server 103 has the same arrangement as that of the controller 201 of the MFP 101. Then, the controller 225 of the server 103 executes the 4D-LUT generation processing described in the first to third embodiments for the respective MFPs 101, and transmits the generated 4D-LUTs to the respective MFPs 101. After that, in each MFP 101, the image processing unit 213 executes the 4D-LUT correction processing (S312) using the received 4D-LUT, thereby matching colors of mixed colors between, a plurality of devices.

More specifically, when the colorimeter 102 which measures colors of an output chart image or the scanner 218 of the MFP 101 outputs colorimetric values, the controller 225 of the server 103 receives them via the network I/F 226. Since the subsequent reference information generation processing (S407), color reproduction range calculation processing (S415), and color correction parameter generation processing (S422) in the controller 225 are the same as those in the first to third embodiments, a description thereof will not be repeated.

Note that in the example of the fourth embodiment, the server 103 is included in a private network environment. Alternatively, an externally connected server may execute the 4D-LUT generation processing.

As described above, according to the fourth embodiment, since the server 103 can generate CMYK→CMYK 4D-LUTs for the respective MFPs 101, loads on the MFPs 101 can be reduced. Furthermore, the server 103 can uniformly manage reference information and the like in the respective MFPs 101. The same effects can also be obtained when the server 103 directly corrects CMYK output data of profiles in the respective MFPs 101 as in the third embodiment.

Other Embodiments

Aspects of the present invention can also be realized by a computer of a system or apparatus (or devices such as a CPU or MPU) that reads out and executes a program recorded, on a memory device to perform, the functions of the above-described embodiment (s), and by a method, the steps of which are performed by a computer of a system or apparatus by, for example, reading out and executing a program recorded on a memory device to perform the functions of the above-described embodiment (s). For this purpose, the program, is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent. Application No. 2011-031262, filed Feb. 16, 2011, which is hereby incorporated by reference herein in its entirety.

What is claimed is:

1. An image processing apparatus comprising:
  a first color reproduction range acquisition unit configured to acquire first color reproduction range data which represents a color reproduction range of a first output device;
  a first color reproduction range determination unit configured to determine based on the first color reproduction range data whether or not data of interest on a device-independent color space falls within the color reproduction range of the first output device;
  a second color reproduction range acquisition unit configured to acquire second color reproduction range data which represents a color reproduction range of a second output device;
  a second color reproduction range determination unit configured to determine based on the second color reproduction range data whether or not the data of interest falls within the color reproduction range of the second output device;
  a common color reproduction range generation unit configured to select the data of interest as common color reproduction range data if the data of interest is determined by the first color reproduction range determination unit to fall within the color reproduction range of the first output device and is determined by the second color reproduction range determination unit to fall within the color reproduction range of the second output device;
  a colorimetric value acquisition unit configured to acquire colorimetric values of an image which is output from the first output device using the common color reproduction range data;

a reference value acquisition unit configured to acquire, as reference values, colorimetric values of an image which is output from the second output device using the common color reproduction range;

a table correction unit configured to correct output values for respective grid points of a first color conversion table included in the image processing apparatus in accordance with differences between the reference values and the colorimetric values corresponding to the common color reproduction range data, wherein the first color conversion table indicates a correspondence from a device-independent color space to a device-dependent color space; and a table generation unit configured to set conversion results of data which represent grid points of a third color conversion table as output values for the grid points of the third color conversion table, wherein the conversion result is obtained by performing conversion using a second color conversion table included in the image processing apparatus and the first color conversion table corrected by the table correction unit, wherein the second color conversion table indicates a correspondence from the device-dependent color space to the device-independent color space, and wherein the third color conversion table is used to correct image data to be output on the device-dependent color space.

2. The apparatus according to claim 1, further comprising:
a third color reproduction range acquisition unit configured to acquire third color reproduction range data which represents a color reproduction range of a third output device, which is different from the first output device and the second output device; and a third color reproduction range determination unit configured to determine based on the third color reproduction range data whether or not the data of interest on a device-independent color space falls within the color reproduction range of the third output device, wherein the common color reproduction range generation unit is further configured to select the data of interest as the common color reproduction range data if the data of interest is determined by the first color reproduction range determination unit to fall within the color reproduction range of the first output device, is determined by the second color reproduction range determination unit to fall within the color reproduction range of the second output device, and is determined by the third color reproduction range determination unit to fall within the color reproduction ranges of the third output device.

3. The apparatus according to claim 1, wherein the device-dependent color space is at least a three-dimensional color space corresponding to at least three colors including cyan, magenta, and yellow.

4. The apparatus according to claim 3, wherein the third color conversion table is a table which represents a color conversion relationship of the image data on a four-dimensional color space corresponding to four colors, wherein the four colors include the at least three colors and black.

5. The apparatus according to claim 4, wherein the table generation unit is further configured to generate the third color conversion table so as to limit an applied amount of a black printing material to be not more than an allowance value.

6. The apparatus according to claim 1, wherein the table generation unit is further configured to generate the third color conversion table so that when an input value to the third color conversion table indicates a pure color, an output value by the third color conversion table indicates a similar pure color.

7. The apparatus according to claim 1, further comprising:
a chart data generation unit configured to convert the common color reproduction range data on the device-independent color space into chart data on the device-dependent color space, using the first color conversion table, wherein the colorimetric value acquisition unit is further configured to acquire colorimetric values of a chart image which is output from the first output device using the chart data.

8. The apparatus according to claim 1, wherein the table correction unit is configured to comprise:
a difference calculation unit configured to calculate a difference between the reference value and the colorimetric value corresponding to that reference value;

a distance calculation unit configured to calculate, for each grid point of the first color conversion table, a distance between the grid point and the reference value;

a calculation unit configured to calculate a sum value of the difference corresponding to the reference value and data for the grid point, wherein the distance corresponding to the reference value is not more than a predetermined threshold; and a correction unit configured to calculate a value on the device-dependent color space corresponding to the sum value using the first color conversion table, and to set the calculated value as an output value for that grid point.

9. The apparatus according to claim 1, further comprising:
a reference information generation unit configured to generate the second color conversion table based on colorimetric values of a chart based on chart data which is obtained by uniformly dividing the device-dependent color space, and to generate the first color conversion table based on the second color conversion table.

10. The apparatus according to claim 1, further comprising:
a profile correction unit configured to correct values on the device-dependent color space in a color conversion profile held by the first output device, using the third color conversion table.

11. An image processing method comprising:
a first acquisition step of acquiring first color reproduction range data which represents a color reproduction range of a first output device;

a first determination step of determining based on the first color reproduction range data whether or not data of interest on a device-independent color space falls within the color reproduction range of the first output device;

a second acquisition step of acquiring second color reproduction range data which represents a color reproduction range of a second output device;

a second determination step of determining based on the second color reproduction range data whether or not the data of interest falls within the color reproduction range of the second output device;

a selection step of selecting the data of interest as common color reproduction range data if the data of interest is determined in the first determining step to fall within the color reproduction range of the first output device and is determined in the second determination step to fall within the color reproduction range of the second output device;

an acquisition step of acquiring colorimetric values of an image which is output from the first output device using the common color reproduction range data;

an acquisition step of acquiring, as reference values, colorimetric values of an image which is output from the second output device using the common color reproduction range;

a correction step of correcting output values for respective grid points of a first color conversion table included in an image processing apparatus in accordance with differences between the reference values and the colorimetric values corresponding to the common color reproduction range data, wherein the first color conversion table indicates a correspondence from a device-independent color space to a device-dependent color space; and a setting step of setting conversion results of data which represent grid points of a third color conversion table as output values for the grid points of the third color conversion table, wherein the conversion result is obtained by performing conversion using a second color conversion table included in the image processing apparatus and the first color conversion table corrected in the correction step, wherein the second color conversion table indicates a correspondence from the device-dependent color space to the device-independent color space, and wherein the third color conversion table is used to correct image data to be output on the device-dependent color space.

12. A non-transitory storage medium storing a program for controlling a computer apparatus to function as respective units of an image processing apparatus of claim 1 when the program is executed by the computer apparatus.

13. An image processing apparatus comprising:

a first color reproduction range acquisition unit configured to acquire first color reproduction range data which represents a color reproduction range of a first output device;

a first color reproduction range determination unit configured to determine based on the first color reproduction range data whether or not data of interest falls within the color reproduction range of the first output device;

a second color reproduction range acquisition unit configured to acquire second color reproduction range data which represents a color reproduction range of a second output device;

a second color reproduction range determination unit configured to determine based on the second color reproduction range data whether or not the data of interest falls within the color reproduction range of the second output device;

a common color reproduction range generation unit configured to select the data of interest as common color reproduction range data if the data of interest is determined by the first color reproduction range determination unit to fall within the color reproduction range of the first output device and is determined by the second color reproduction range determination unit to fall within the color reproduction range of the second output device;

a colorimetric value acquisition unit configured to acquire colorimetric values of an image which is output from the first output device using the common color reproduction range data;

a reference value acquisition unit configured to acquire, as reference values, colorimetric values of an image which is output from the second output device using the common color reproduction range; and a table correction unit configured to correct output values for respective grid points of a first color conversion table included in the image processing apparatus in accordance with differences between the reference values and the colorimetric values corresponding to the common color reproduction range data.

\* \* \* \* \*